US012462998B2

(12) United States Patent
Sikora et al.

(10) Patent No.: US 12,462,998 B2
(45) Date of Patent: Nov. 4, 2025

(54) MOUNTING ASSEMBLY AND SWITCHING SYSTEM WITH UNIVERSAL MOUNTING SYSTEM

(71) Applicant: Eaton Intelligent Power Limited, Dublin (IE)

(72) Inventors: Kyle Larry Sikora, Oak Creek, WI (US); William Robert Luoma, Franklin, WI (US); James Henry Grace, Oak Creek, WI (US); Sara C. Knox, Milwaukee, WI (US); Paul N. Stoving, Oak Creek, WI (US)

(73) Assignee: Eaton Intelligent Power Limited, Dublin (IE)

( * ) Notice: Subject to any disclaimer, the term of this patent is extended or adjusted under 35 U.S.C. 154(b) by 513 days.

(21) Appl. No.: 17/068,939

(22) Filed: Oct. 13, 2020

(65) Prior Publication Data

US 2021/0125803 A1 Apr. 29, 2021

Related U.S. Application Data

(60) Provisional application No. 62/959,378, filed on Jan. 10, 2020, provisional application No. 62/926,152, filed on Oct. 25, 2019.

(51) Int. Cl.
*H01H 71/02* (2006.01)
*H01H 71/08* (2006.01)
*H01H 81/00* (2006.01)

(52) U.S. Cl.
CPC ........ *H01H 71/0264* (2013.01); *H01H 81/00* (2013.01); *H01H 71/08* (2013.01)

(58) Field of Classification Search
CPC .... H01H 71/0264; H01H 81/00; H01H 71/08; H01H 71/24; H01H 50/14; H01H 31/02;
(Continued)

(56) References Cited

U.S. PATENT DOCUMENTS 969,676 A * 9/1910 Tomlinson ....... H01R 13/62933 439/378
4,105,878 A 8/1978 Date et al.
(Continued)

FOREIGN PATENT DOCUMENTS

EP 668334 A5 * 12/1988 ........... H01H 33/666
WO 2002099826 A1 12/2002
(Continued)

OTHER PUBLICATIONS

Translation of CH668334 (Original document published Dec. 15, 1988) (Year: 1988).*
(Continued)

*Primary Examiner* — William A Bolton
(74) *Attorney, Agent, or Firm* — DiBerardino McGovern IP Group LLC

(57) ABSTRACT

A switching apparatus includes: a body including: a sidewall that extends from a first end to a second end, the sidewall defining an interior space; and a plurality of electrically insulating sheds that extend radially outward from an exterior surface of the sidewall; a circuit interrupter in the interior space of the body; a first terminal electrically connected to the circuit interrupter; and a second terminal electrically connected to the circuit interrupter. The switching apparatus is configured to be mechanically connected to at least two different types of mounting structures.

28 Claims, 16 Drawing Sheets

(58) Field of Classification Search
CPC ........ H01H 31/12; H01H 31/20; H01H 33/00; H01H 33/025; H01H 33/06; H01H 33/125; H01H 33/6661; H01H 33/008; H01H 2033/6623; G01R 15/14
USPC .......... 200/49; 218/155, 156, 10, 12, 79–80, 218/100, 118
See application file for complete search history.

(56) References Cited

U.S. PATENT DOCUMENTS

| | | | | |
|---|---|---|---|---|
| 4,748,304 | A * | 5/1988 | Soboul | H01H 33/24 218/43 |
| 6,687,110 | B2 * | 2/2004 | Murray | H01H 33/6661 361/131 |
| 6,753,493 | B2 | 6/2004 | Rhein et al. | |
| 6,794,596 | B2 | 9/2004 | Rhein et al. | |
| 6,852,939 | B2 | 2/2005 | Rhein et al. | |
| 7,215,228 | B2 | 5/2007 | Rhein | |
| 8,334,738 | B2 | 12/2012 | Smith et al. | |
| 8,785,804 | B2 | 7/2014 | Gibson | |
| 8,824,116 | B2 | 9/2014 | Smith et al. | |
| 8,941,960 | B2 | 1/2015 | Murray | |
| 10,091,885 | B2 | 10/2018 | Murray et al. | |
| 2002/0179571 | A1 * | 12/2002 | Rhein | H01H 33/6662 218/7 |
| 2008/0309437 | A1 * | 12/2008 | Smith | H01H 1/0015 361/72 |
| 2012/0049995 | A1 * | 3/2012 | Murray | H01H 75/04 337/2 |
| 2015/0116878 | A1 | 4/2015 | Richard et al. | |
| 2017/0285074 | A1 * | 10/2017 | Korves | H01C 1/02 |
| 2020/0266620 | A1 * | 8/2020 | Smith | H01H 1/0015 |
| 2020/0328054 | A1 * | 10/2020 | Hanna | H01H 33/125 |

FOREIGN PATENT DOCUMENTS

| | | | |
|---|---|---|---|
| WO | 2013169716 | A1 | 11/2013 |
| WO | 2019133611 | A1 | 7/2019 |

OTHER PUBLICATIONS

Jose Miguel Nieto, European International Searching Authority, International Search Report and Written Opinion, counterpart PCT Application No. PCT/EP2020/025461 mailed Dec. 22, 2020, 12 pages total.

Compact Modular Recloser (Siemens), North American Clean Energy, available at www.nacleanenergy.com/articles/34489/compact-modular-recloser-, May/Jun. 2019.

Cooper Power Series: SPEAR® single-phase recloser system, CA280001EN, Eaton, Jun. 2016.

Cooper Power Series: Types E, 4E, V4E, H, 4H, V4H, L, and V4L single-phase recloser installation and operation instructions, MN280051EN, Eaton, May 2017.

Fusesaver™ medium-voltage circuit breaker, Data Sheet, Siemens Industry, Inc., 2018.

S&C VacuFuse™ Self-Resetting Interrupter, Information Bulletin 465-200, S&C Electric Company, Apr. 29, 2019.

TripSaver® II Cutout-Mounted Recloser, Descriptive Bulletin 461-32, S&C Electric Company, May 28, 2019.

Versa-Tech® II Recloser, Catalog 10EE, Hubbell Power Systems, Jan. 2014.

Office Action, counterpart Chinese Application No. 202080070343.9, issued May 23, 2024, 10 pages total (including English language summary of 1 page).

IEC 60050—International Electrotechnical Vocabulary, clause 471-01-15, "shed (of an insulator)" May 2007.

Office Action, counterpart Chinese Application No. 202080070343.9, issued Feb. 28, 2025, 9 pages total (including English language summary of 2 pages).

E. Koh, IP Australia, Examination Report in counterpart AU Patent Application No. 2020372550, mailed Mar. 31, 2025, 4 pages total.

Office Action, counterpart Chinese Application No. 202080070343.9, issued Jun. 6, 2025, 7 pages total (including English language summary of 2 pages).

* cited by examiner

410

MOUNTING ASSEMBLY AND SWITCHING SYSTEM WITH UNIVERSAL MOUNTING SYSTEM

CROSS-REFERENCE TO RELATED APPLICATIONS

This application claims the benefit of U.S. Provisional Application No. 62/926,152, filed on Oct. 25, 2019 and titled MOUNTING ASSEMBLY AND SWITCHING SYSTEM WITH UNIVERSAL MOUNTING SYSTEM, which is incorporated herein by reference in its entirety; and to U.S. Provisional Application No. 62/959,378, filed on Jan. 10, 2020 and titled MOUNTING ASSEMBLY AND SWITCHING SYSTEM WITH UNIVERSAL MOUNTING SYSTEM, which is incorporated herein by reference in its entirety.

TECHNICAL FIELD

This disclosure relates to a mounting assembly and to a switching apparatus (such as, for example, a single-phase recloser) with a universal mounting system.

BACKGROUND

An electrical assembly (for example, a switch or fuse) may be mounted to a utility structure (such as, for example, a utility pole) or cutout.

SUMMARY

In one aspect, a switching apparatus includes: a body including: a sidewall that extends from a first end to a second end, the sidewall defining an interior space; and a plurality of electrically insulating sheds that extend radially outward from an exterior surface of the sidewall; a circuit interrupter in the interior space of the body; a first terminal electrically connected to the circuit interrupter; and a second terminal electrically connected to the circuit interrupter. The switching apparatus is configured to be mechanically connected to at least two different types of mounting structures.

Implementations may include one or more of the following features.

The at least two different types of mounting structures may include an electrically insulating bracket and a utility structure.

The at least two different types of mounting structures may include a first portion of a utility structure and a second portion of a utility structure. The first portion of the utility structure may be a utility pole, and the second portion of the utility structure may be a cross-arm mounted to the utility pole.

The switching apparatus also may include a tank coupled to the body. The tank may be an ungrounded tank or a grounded tank. The switching apparatus also may include a mechanical interface configured to connect to a support, the support configured to attach the tank to a utility structure. In some implementations in which the tank is an ungrounded tank, the mechanical interface is configured to attach to an insulated support. In some implementations in which the tank is a grounded tank, the mechanical interface is configured to attach to an electrically conductive support. The mechanical interface may be a mounting strap that surrounds at least a portion of an exterior of the tank. The mechanical interface may include a connection point on an exterior surface of the tank, and the connection point is configured to allow the structure to be attached to the tank at the mechanical interface and removed from the tank without damaging the tank, the mechanical interface, or the support.

The electrically insulated bracket may be a visible break mounting bracket. The visible break mounting bracket may be a fused cutout. In some implementations, the electrically insulated bracket is a cutout that lacks a fuse.

In some implementations, the switching apparatus also includes a first mounting assembly configured to connect the first terminal to a lower portion of the insulating mounting bracket; and a second mounting assembly configured to connect the second terminal to an upper portion of the insulating mounting bracket. The first mounting assembly may be configured to keep the first terminal connected to the lower portion until the first terminal is intentionally removed from the lower portion by an operator, and the second mounting assembly may be configured to keep the second terminal connected to the upper portion until the second terminal is intentionally removed from the lower portion by an operator. One or more of the first mounting assembly and the second mounting assembly may be configured to allow the body to move relative to the insulating mounting bracket. The system assembly also may include a damping apparatus configured to damp intentional movement of the body relative to the insulating mounting bracket.

In some implementations, the circuit interrupter is a switch capable of repeatedly opening and closing. In these implementations, the switching assembly may be a single-phase recloser. The circuit interrupter may be a vacuum interrupter. The circuit interrupter may be a solid-state switch.

In another aspect, a system includes: an insulating mounting bracket that includes an upper portion and a lower portion; a switching apparatus including: a body that extends along a direction from a first end to a second end, a first terminal, a second terminal, and a circuit interrupter electrically connected to the first terminal and the second terminal; a first mounting assembly configured to connect the first terminal to the lower portion of the insulating mounting structure; and a second mounting assembly configured to mechanically connect the second terminal to an upper portion of the insulating mounting structure. The first mounting assembly does not permit the body to rotate about the lower portion of the insulating mounting structure.

Implementations may include one or more of the following features. The first mounting assembly may be configured to fixedly connect the first terminal to the lower portion of the insulating mounting structure such that the first mounting assembly does not permit the body to move relative to the lower portion of the insulating mounting structure. The second mounting assembly may be configured to fixedly connect the second terminal to the upper portion of the insulating mounting structure, such that the second mounting assembly does not permit the body to move relative to the upper portion of the insulating mounting structure. The first mounting assembly may include one or more of a latch, a bracket, a fastener, or a screw; and the second mounting assembly may include one or more of a latch, a bracket, a fastener, or a screw.

In some implementations, the system further includes a damping apparatus configured to damp intentional movement of the body relative to the insulating mounting structure. The damping apparatus may be part of one or more of the first mounting assembly and the second mounting assembly. The damping apparatus may be configured to damp one or more of intentional rotational motion or translational motion of the body. The damping apparatus may include a frictional region configured to engage a connection portion coupled to the switching apparatus. The system also may include a connection portion configured to attach to the first terminal of the switching apparatus, and the frictional region may be a frictional track configured to engage with the connection portion.

The second mounting assembly may include a pivot structure coupled to the upper portion of the insulating mounting structure, and the first mounting assembly may be configured to release the first terminal from the lower portion of the insulating mounting structure, such that when the first terminal is released by the first mounting assembly, the body rotates about the upper portion of the insulating mounting structure. The first connection assembly also may include a frictional track, and the system also may include a connection portion connected to the first terminal. The frictional track may configured to engage the connection portion to dampen the rotation of the body about the upper portion of the insulating mounting structure. The first connection assembly also may include a hook structure configured to engage with a lever coupled to the body, and, to release the first terminal from the lower portion of the insulating mounting structure, the lever may disengage with the hook structure.

The circuit interrupter may include a vacuum interrupter, and the switching apparatus may be a recloser.

In another aspect, a kit for retrofitting a switching apparatus includes: a first mounting assembly configured to attach a first terminal of the switching apparatus to a lower portion of an insulating mounting structure; and a second mounting assembly configured to attach a second terminal of the switching apparatus to an upper portion of the insulating mounting structure. The first mounting assembly is configured to prevent the switching apparatus from rotating about the lower portion of the insulating mounting structure.

In another aspect, a kit for retrofitting a switching apparatus such that the switching apparatus is connectable to a utility structure or an insulating mounting bracket includes: an attachment apparatus including a first end and a second end, where the first end is configured for attachment to a tank of the switching apparatus, and the second end is configured for attachment to the utility structure such that the attachment apparatus is configured to mount the switching apparatus to the utility structure; a first mounting assembly configured to attach a first terminal of the switching apparatus to a lower portion of the insulating mounting bracket; and a second mounting assembly configured to attach a second terminal of the switching apparatus to an upper portion of the insulating mounting bracket.

In another aspect, a system includes: a switching apparatus that includes: a body including a sidewall that defines an interior space; a tank coupled to the body; a circuit interrupter in the interior space of the body, the circuit interrupter including a switch that is capable of repeatedly opening and closing; a first terminal electrically connected to the circuit interrupter; a second terminal electrically connected to the circuit interrupter; and an attachment apparatus is configured for attachment to a utility structure and to the switching apparatus such that the attachment apparatus is configured to mount the switching apparatus to the utility structure.

Implementations may include one or more of the following features.

The attachment apparatus may include a support, the support including a first end and a second end, the first end may be configured for attachment to the tank of the switching apparatus, and the second end may be configured for attachment to the utility structure.

In some implementations, the system also includes: a first mounting assembly configured to attach a first terminal of the switching apparatus to a lower portion of an insulating mounting bracket; and a second mounting assembly configured to attach the second terminal of the switching apparatus to an upper portion of the insulating mounting bracket. In these implementations, the switching apparatus is configured to be attached to the utility structure or to the insulating mounting bracket.

The attachment apparatus may include a first attachment apparatus configured to mount the switching apparatus to a first portion of the utility structure, and the system also may include a second attachment apparatus configured to mount the switching apparatus to a second portion of the utility structure. The first portion of the utility structure may be a utility pole, and the second portion of the utility structure may be a cross-arm mounted on the utility pole.

Implementations of any of the techniques described herein may include a system, a mounting assembly, a kit for retrofitting an existing switching apparatus, and/or a method. The details of one or more implementations are set forth in the accompanying drawings and the description below. Other features will be apparent from the description and drawings, and from the claims.

DRAWING DESCRIPTION

DETAILED DESCRIPTION

Figure 1:
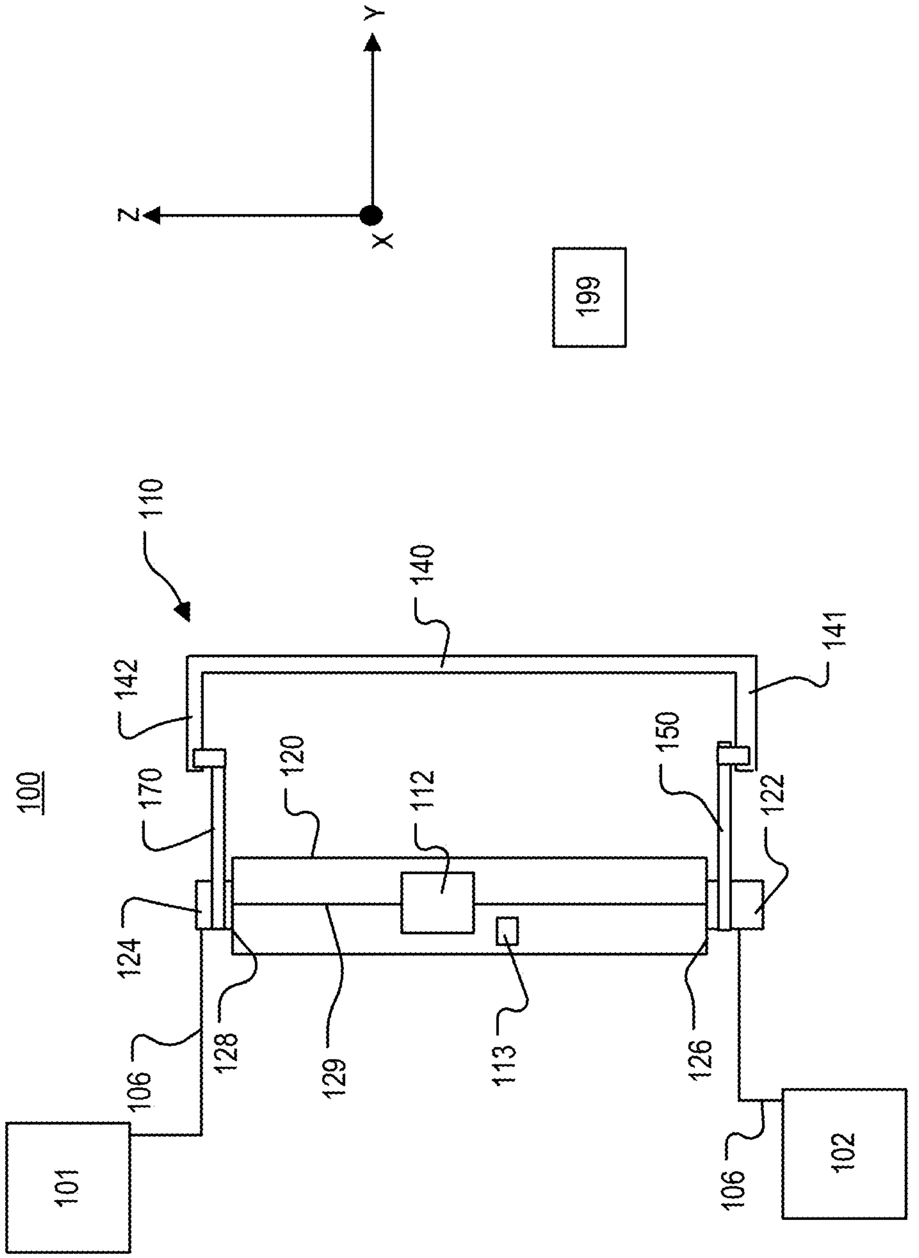
FIG. 1 is a block diagram of high-power electrical distribution system.

FIG. 1 is a block diagram of high-power electrical distribution system 100. The electrical distribution system 100 delivers electricity from a source 101 to a load 102 via a distribution path 106. The distribution path 106 may include, for example, one or more distribution lines, electrical cables, and/or any other mechanism for transmitting electricity. The electrical power distribution system 100 may be, for example, an electrical grid, an electrical system, or a multi-phase electrical network that provides electricity to commercial and/or residential customers. The electrical power distribution system 100 may have an operating voltage of, for example, at least 1 kilovolt (kV), up to 34.5 kV, up to 38 kV, up to 69 kV, or 69 kV or higher. The electrical power distribution system 100 is an alternating current (AC) electrical network and may operate at a fundamental frequency of, for example, 50 to 60 Hertz (Hz).

The system 100 includes a switching apparatus 110. The apparatus 110 includes a body 120 that encloses a switch 112. The switch 112 is any type of device capable of interrupting the supply of electricity to the load 102. The switch 112 may be rated for voltages between, for example, 15 kV and 38 kV, between 15 kV and 30 kV, for voltages greater than 15 kV, for 15 kV, or for 29.2 kV. The switch 112 may be rated for continuous current of, for example, between 100 amperes (A) and 600 A, or between 100 and 200 A. The switch 112 may be capable of interrupting fault currents of, for example, 1 kA to 10 kA, 1 kA to 4 kA, 1 kA to 7 kA, or 6.3 kA. The switch 112 may be, for example, a switch that is capable of opening and closing repeatedly, such as a vacuum interrupter or a solid state device. Other types of devices that are capable of interrupting and conducting current but are not necessarily capable of opening and closing repeatedly, such as a fuse, may be used as the switch 112. In implementations in which the switch 112 is a vacuum interrupter or other switch that is capable of opening and closing repeatedly, the apparatus 110 is a recloser and may be a single-phase, solid dielectric recloser.

The switch 112 includes associated components 113. In implementations in which the switch 112 is a vacuum interrupter and the apparatus 110 is a recloser, the associated components 113 may include actuation devices to cause contacts of the vacuum interrupter 112 to open and close and electronics for controlling the actuation devices and for communicating with a remote station 199. The remote station 199 may be, for example, a remote control or a remote laptop or other computing device.

The body 120 is physically connected or mounted to a mounting structure 140. Specifically, the body 120 is mechanically connected to a lower portion 141 of the mounting structure 140 by a first mounting assembly 150, and the body 120 is mechanically connected to an upper portion 142 of the mounting structure 140 by a second mounting assembly 170. The first mounting assembly 150 and the second mounting assembly 170 provide a variety of mounting options and increase the usability of the apparatus 110. For example, the first mounting assembly 150 and the second mounting assembly 170 allow the body 120 to be mounted to variety of different types of mounting structures, such as, for example, an insulated mounting bracket, which may be a fused cutout, a cutout without a fuse, or a visible break mounting bracket. This allows standardization of the end user's inventory and installation procedures and increases the ease of use and efficiency of the apparatus 110.

The switch 112 is electrically connected to a first terminal 122 and a second terminal 124 via an electrical connection 129. In implementations in which the switch 112 is a vacuum interrupter, the electrical connection 129 includes an actuator and an operating rod that open and close the electrical contacts of the switch 112. The first and second terminals 122 and 124 are made of an electrically conductive material such as, for example, copper, a copper alloy, or any other metallic material. The body 120 is a three-dimensional object that extends from a first end 126 to a second end 128. In the example of FIG. 1, the second terminal 124 extends from the second end 128 of the body 120, and the first terminal 122 extends from the first end 126 of the body 120. The second terminal 124 may extend through a second opening in the body 120, and the first terminal 122 may extend through a first opening in the body 120. The body 120 is made of an electrically insulating material, such as, for example, ceramic, a rugged polymer, or any other suitable electrically insulating material. The body may or may not include insulating sheds.

In the example shown, the second terminal 124 is electrically connected to the electrical power source 101, and the first terminal 122 is electrically connected the load 102. However, in other implementations, the second terminal 124 is electrically connected to the load 102, and the first terminal 122 is electrically connected to the power source 101.

The electrical load 102 is any device or devices that utilizes electricity and may include electrical equipment that receives and transfers or distributes electricity to other equipment in the distribution system 100. The electrical load 102 may include, for example, transformers, switchgear, energy storage systems, computer and communication equipment, lighting, heating and air conditioning, motors and electrical machinery in a manufacturing facility, and/or electrical appliances and systems in a residential building. The power source 101 is any source of electricity such as, for example, a power plant that generates electricity from fossil fuel or from thermal energy, or an electrical substation. The power source 101 may include one or more distributed energy resources, such as, for example, a solar energy system that includes an array of photovoltaic (PV) devices that convert sunlight into electricity or a wind-based energy system. More than one power source may supply electricity to the distribution system 100, and more than one type of power source may supply electricity to distribution system 100.

Under normal and expected operating conditions, the switch 112 is closed. Electrical current flows through the switch 112 and is delivered to the load 102. In the presence of a fault condition (for example, a current and/or voltage that exceeds the safe operating parameters of the load 102), the switch 112 opens to interrupt the supply to the load 102. In implementations in which the switch 112 is a recloser, the switch 112 may close and reopen several times to attempt to clear the fault before locking out and remaining open.

Figure 7:
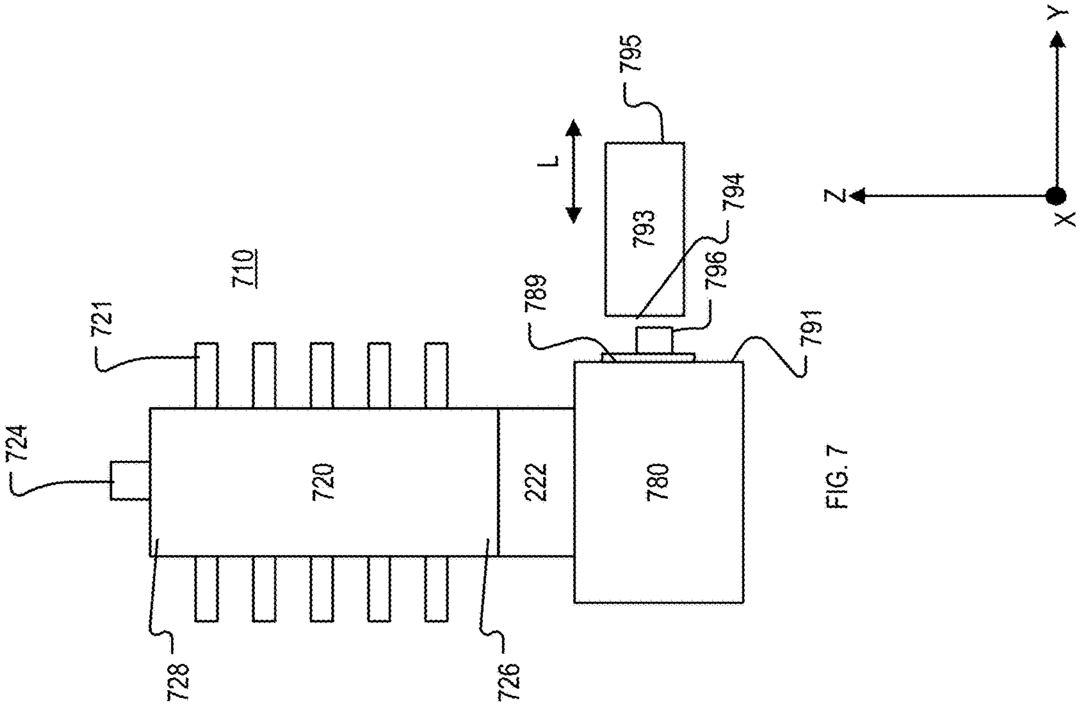
FIGS. 6-8 show various switching apparatuses.
Figure 8:
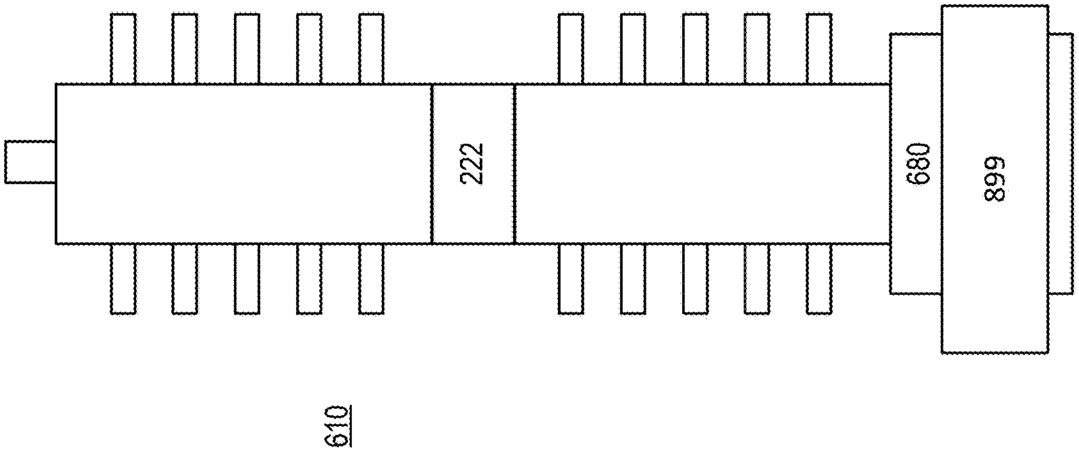

Various implementations of the first mounting assembly 150 and the second mounting assembly 170 are discussed below with respect to FIGS. 2, 3, 4A-4G, and 5A-5F. Various implementations of a switching apparatus that has a dual-mounting or universal mounting system are shown in FIGS. 6-8.

Figure 2:
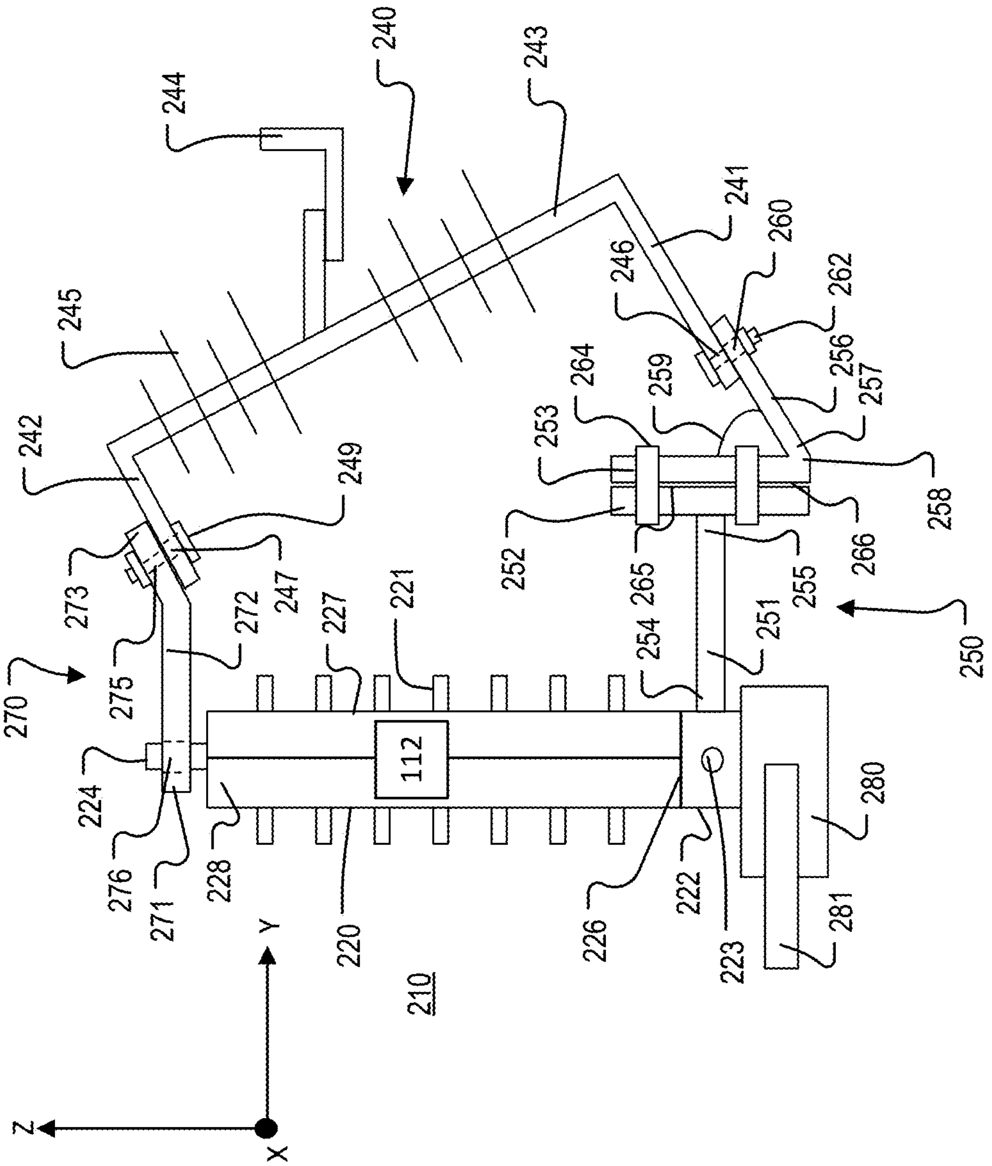
FIG. 2 is a side block diagram of an apparatus.

FIG. 2 is a side block diagram of an apparatus 210. The apparatus 210 is an implementation of the apparatus 110 (FIG. 1). The apparatus 210 includes a body 220 that encloses the switch 112. The switch 112 is electrically connected to a source terminal 224, which extends from a second end 228 of the body 220, and to a load terminal 222, which is near a first end 226 of the body 220. The source terminal 224 is configured to be electrically connected to a source (such as the source 101 of FIG. 1). The load terminal 222 is configured to be electrically connected to a load (such as the load 102 of FIG. 1). The body 220 is a three-dimensional object and may be, for example, substantially cylindrical in shape. The body 220 includes a plurality of insulating sheds 221, each of which extend in the X-Y plane outward from an exterior surface 227. The body 220 includes a base 280 (or tank 280) at the first end 226. The base 280 is attached to an operating handle 281. The operating handle 281 is coupled to the switch 112 and allows the switch to be manually opened or closed from outside the body 220.

The body 220 is mounted to a cutout 240 by a first mounting assembly 250 and a second mounting assembly 270, which are discussed further below.

In the example of FIG. 2, the cutout 240 is a cutout that has a substantially U shape or C shape in the Y-Z plane. The cutout 240 is made of an electrically insulating material. For example, the cutout 240 may be made of a ceramic or an insulating polymer. The cutout 240 includes an upper portion 242 and a lower portion 241. A middle portion 243 extends between the upper portion 242 and the lower portion 241. Insulating sheds 245 extend perpendicularly from the middle portion 243. The middle portion 243, the upper portion 242, and the lower portion 241 are joined together or made from a single, continuous piece of insulating material such that the cutout 240 is a unitary piece (for example, ceramic with metal inserts or polymer overmolded on metal or fiberglass). The cutout 240 also includes a mounting mechanism 244 that extends from the middle portion 243 in the Y direction. The mounting mechanism 244 allows the cutout 240 to be attached to a separate structure, such as a utility pole or a cross arm.

The first mounting assembly 250 connects the load terminal 222 to the lower portion 241 of the cutout 240. The second mounting assembly 270 connects the source terminal 224 to the upper portion 242 of the cutout 240. The first mounting assembly 250 and the second mounting assembly 270 rigidly attach the body 220 to the cutout 240 and do not permit movement of the body 220 relative to the cutout 240. The body 220 does not drop out of the cutout 240. Thus, the relatively complex connection points that traditionally allows a body to drop out of a cutout are not needed. This results in a lower cost and simpler design. Moreover, the rigid connections ensure good electrical contact at the terminals 222 and 224. Furthermore, the rigid mounting assemblies 250 and 270 may be used in a retrofit kit to adapt a pole-mounted design into the cutout 240. Examples of pole-mounted designs are shown in FIGS. 6-8.

The first mounting assembly 250 includes a first connection portion 251, a first connection plate 252, a second connection plate 253, and a second connection portion 256. The first connection portion 251 connects to the load terminal 222. In the example of FIG. 2, the load terminal 222 is a ring assembly that has a circular cross-section in the X-Y plane. The ring assembly 222 includes threaded openings or holes 223, any of which may receive a threaded terminal connection end 254 of the first connection portion 251.

The terminal 222 may include six openings 223, each spaced, for example, about 60 degrees apart from each other. Other configurations of the ring assembly 222 are possible. For example, the ring assembly 222 may include more or fewer than six of the openings 223. The openings 223 may be spaced in any configuration suitable for the application. For example, openings 223 may be spaced non-uniformly.

The first connection plate 252 is attached to a second end 255 of the first connection portion 251. The first connection plate 252 is perpendicular to the first connection portion 251, and the first connection portion 251 is attached to the first connection plate 252 at or near the center of the first connection plate 252. In the example shown in FIG. 2, the body 220 extends in the Z direction and, when the first connection portion 251 is connected to the load terminal 222, the first connection portion 251 extends in the Y direction, and the first connection plate 252 extends in the Z direction. The first connection plate 252 and the first connection portion 251 may be two pieces that are permanently attached to each other by, for example, welding, brazing, or soldering. In some implementations, the first connection plate 252 and the first connection portion 251 are formed from a single piece.

The second connection plate 253 is a plate-like structure that is attached to the second connection portion 256. The first and second connection plates have respective surfaces 265 and 266 that are substantially flat and extend in the X-Z plane. An end 257 of the second connection portion 256 is attached to an end region 258 of the second connection plate 253. The second connection portion 256 extends from the end region 258 at an angle 259. The angle 259 is less than 90 degrees (°). The second connection plate 253 and the second connection portion 256 may be formed from separate pieces that are permanently joined, or the second connection plate 253 and the second connection portion 256 may be formed from a single piece of material.

To join the load terminal 222 to the lower portion 241 of the cutout 240, the threaded connection end 254 of the first connection portion 251 is screwed into one of the openings 223 in the terminal 222. The first and second connection plates 252 and 253 are positioned with the respective surfaces 265 and 266 facing each other. The plates 252 and 253 are mounted to each other with fasteners 264 (such as screws).

The second connection portion 256 extends away from the surface 266. The second connection portion 256 includes an opening 260 (shown with dashed lines), and the lower portion 241 includes an opening 246 (shown with dashed lines). When the first connection portion 251 is connected to the load terminal 222, and the first connection plate 252 is connected to the second connection plate 253, the opening 260 aligns with the opening 246. A fastener 262 passes through the openings 246 and 260 to connect the second connection portion 256 to the lower portion 241. The fastener 262 may include a screw that passes through the openings 246 and 260 and is secured by a nut.

Figure 3:
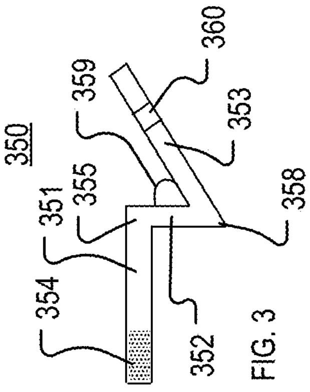
FIG. 3 is a side block diagram of a mounting assembly.

Referring also to FIG. 3, a first mounting assembly 350 is shown. The first mounting assembly 350 is another implementation of the first mounting assembly 250. The first mounting assembly 350 may be used with the body 220 instead of the first mounting assembly 250. The first mounting assembly 350 includes a first connection portion 351, a second connection portion 352, and a third connection portion 353. The first mounting assembly 350 is a single piece and includes fewer portions than the first mounting assembly 250. Thus, the assembly 350 may be simpler to manufacture than the assembly 250.

The first connection portion 351 includes a threaded end portion 354 (shown with shading) that is configured to connect to one of the threaded openings 223 in the ring terminal 222. The second connection portion 352 is connected to an end 355 of the first connection portion 351. The end 355 is opposite the end portion 354. The second connection portion 352 extends perpendicularly to the first connection portion 351 to an end 358. The third connection portion 353 meets the second connection portion 352 at the end 358. The third connection portion 353 extends at an angle 359 relative to the second connection portion 352. The angle 359 is less than 90°. When the threaded end portion 354 is connected to the threaded opening in the ring terminal 222, the first connection portion 351 extends in the Y direction, and the second connection portion 352 extends in the Z direction. The third portion 353 includes an opening 360. The third portion 353 is attached to the lower portion 241 by passing the fastener 262 through the opening 360 and the opening 246 and securing the fastener 262.

Referring again to FIG. 2, regardless of which implementation of the first mounting assembly is used, both of the first mounting assemblies 250 and 350 rigidly secure the lower portion 241 of the cutout 240 to the body 220. Neither the first mounting assembly 250 nor the first mounting assembly 350 permit the body 220 to rotate in the Y-Z plane or to otherwise move relative to the cutout 240.

The second mounting assembly 270 includes a single-piece connection portion 271. The connection portion 271 includes a first region 272 and a second region 273, which is angled relative to the first region 272. The first region 272 and the second region 273 are substantially flat pieces. The angle between the first region and the second region 273 is greater than 90°. The first region 272 includes an opening 276 that receives the second terminal 224. The second region 273 includes an opening 275, and the upper portion 242 includes an opening 247. When the connection portion 271 is attached to the second terminal 224, and the first mounting assembly 250 connects the terminal 222 to the lower portion 241 of the cutout 240, the opening 247 aligns with the opening 275. A fastener 249 passes through the opening 275 and the opening 275 to secure the connection portion 271 to the upper portion 242 of the cutout 240. Thus, the second mounting assembly 270 physically attaches the second end 228 of the body 220 to the upper portion 242 of the cutout 240.

After the body 220 is attached to the cutout 240 with the first mounting assembly 250 (or 350) and the second mounting assembly 270, the body 220 remains attached to the cutout 240 until the fasteners 249 and 262 are intentionally removed. In other words, the first mounting assembly 250 (or 350) and the second mounting assembly 270 hold the body 220 in a fixed position in the cutout 240 such that the body 220 does not move relative to the cutout.

Figure 4A:
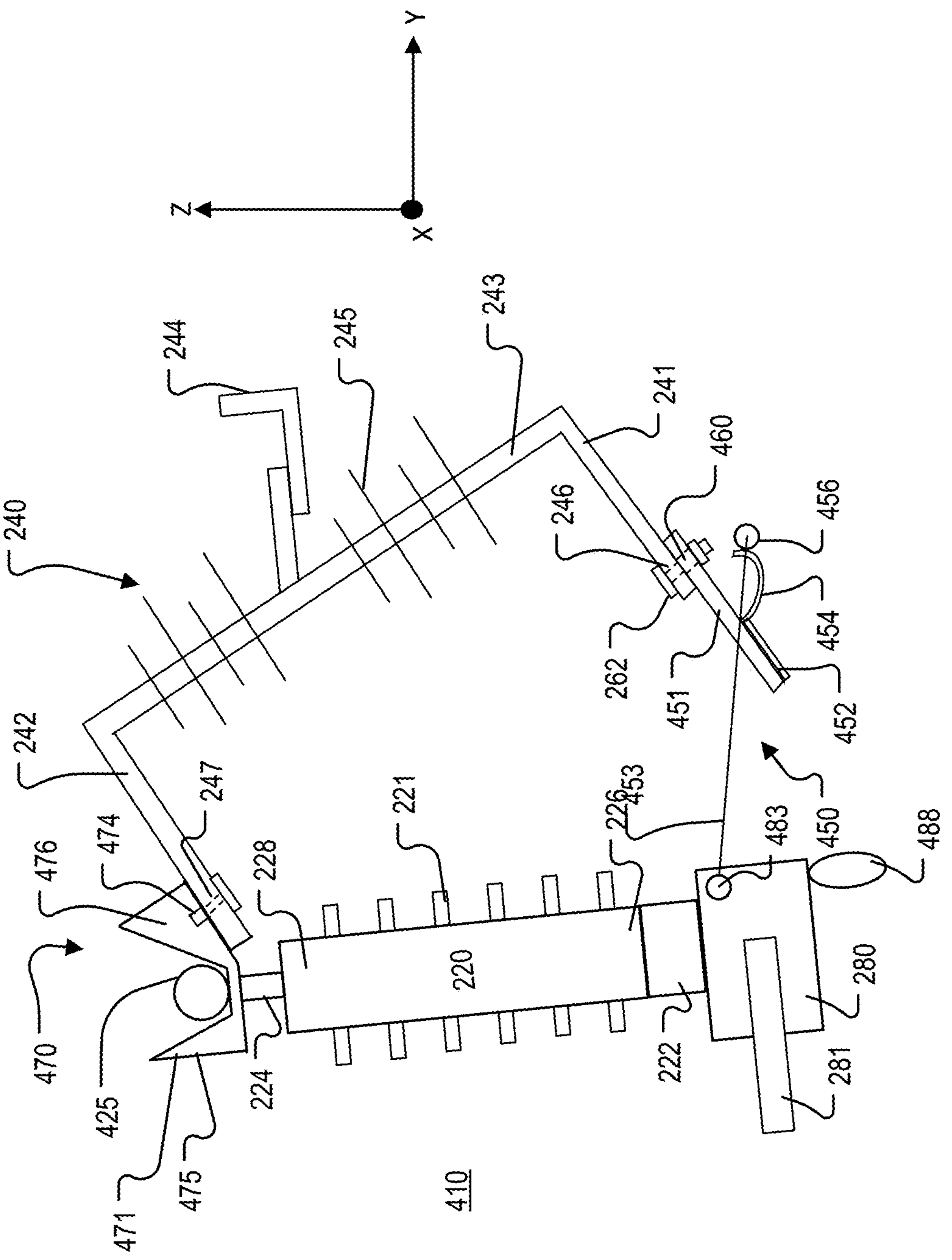
FIGS. 4A and 4B are side block diagrams of a switching apparatus.
Figure 4B:
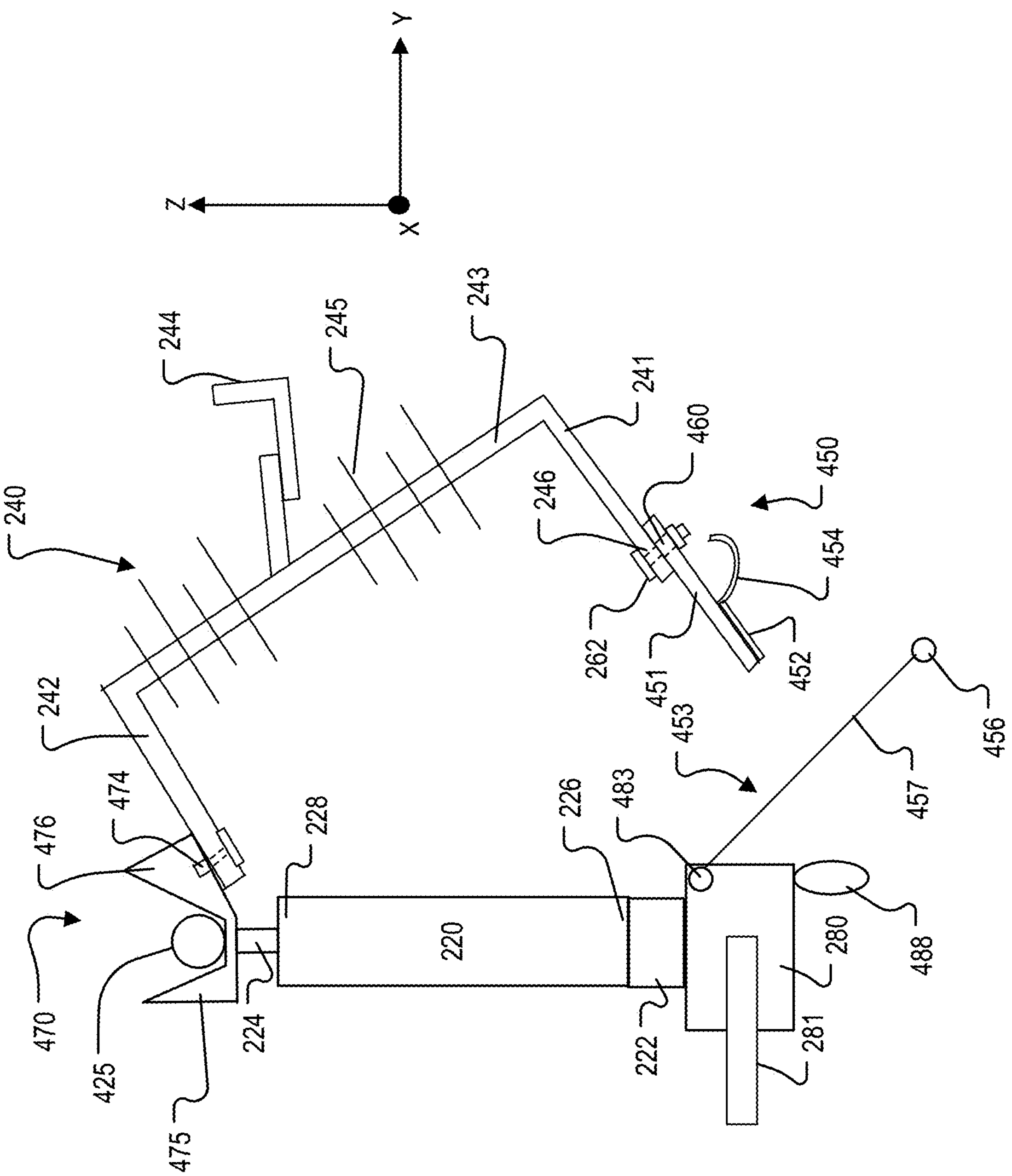
Figure 5B:
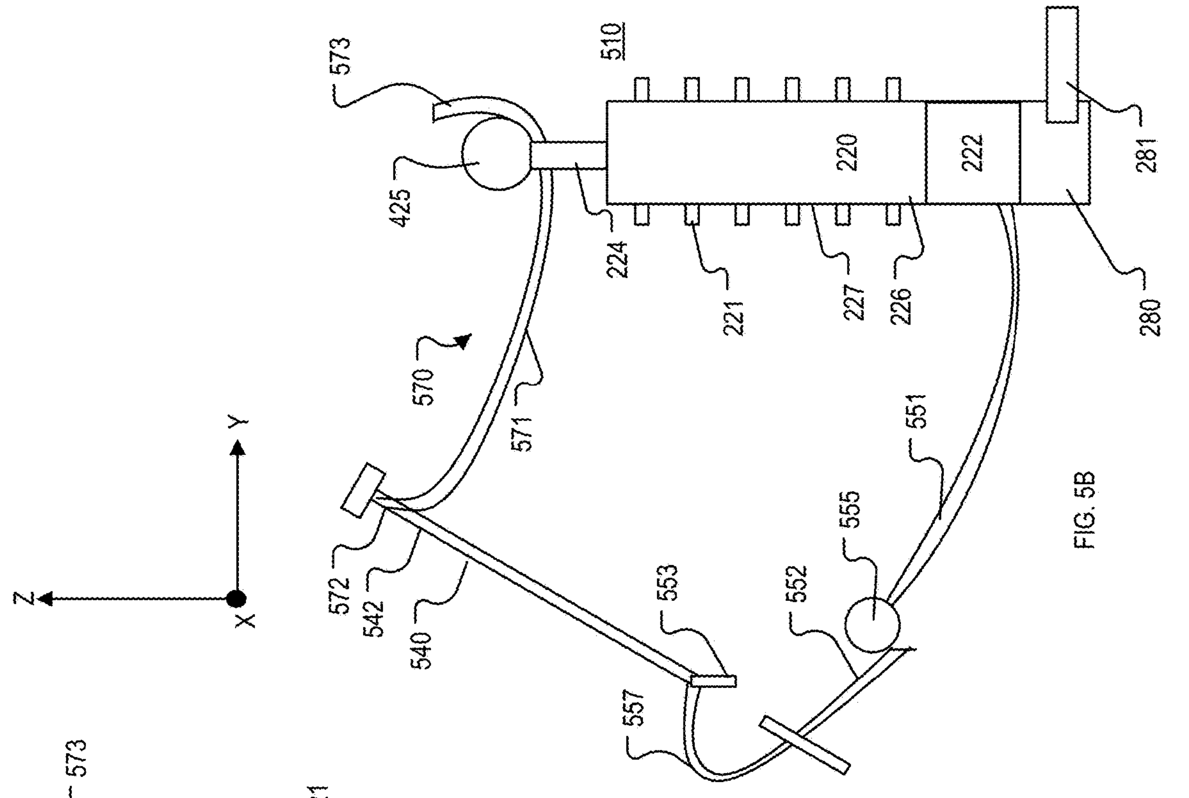
FIGS. 5A and 5B are side block diagrams of a switching apparatus.

FIGS. 4A and 4B are side block diagrams of an apparatus 410. The apparatus 410 is another implementation of the apparatus 110 (FIG. 1). FIG. 4A shows the apparatus 410 in a locked state. FIG. 4B shows the apparatus 410 in a released state.

The apparatus 410 includes the body 220, the load terminal 222, the source terminal 224, and the cutout 240. The terminal 224 is connected to a rod structure 425. The rod structure 425 extends into and out of the page in FIGS. 4A and 4B. The apparatus 410 includes a first mounting assembly 450 and a second mounting assembly 470. The mounting assemblies 450 and 470 mount the body 220 to the cutout 240.

Figure 4E:
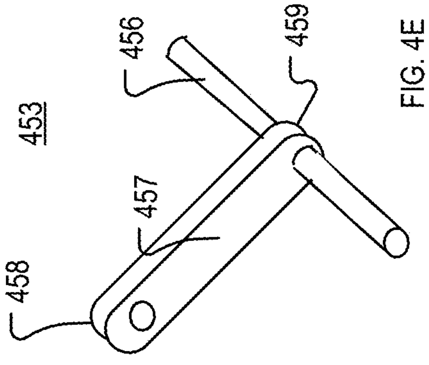
FIGS. 4C-4E show various aspects of another mounting assembly.
Figure 4C:
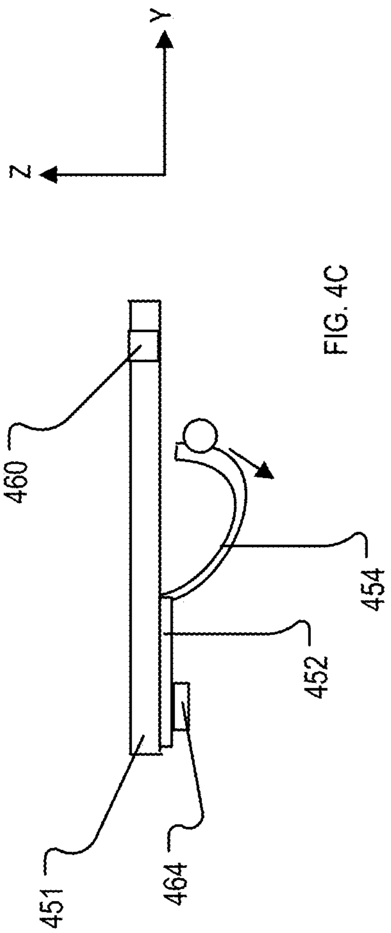
Figure 4D:
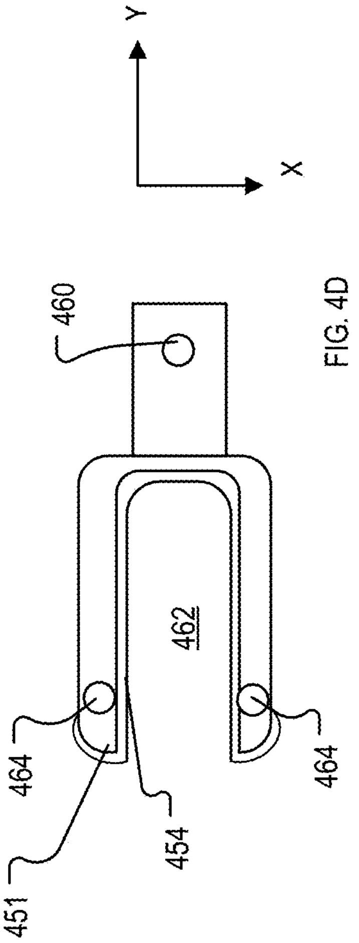

The mounting assembly 450 includes a connection portion 451, a spring-loaded cam retainer 452, and a release lever 453. The connection portion 451 and the release lever 453 are made of a rigid material, such as metal or a rugged plastic. The spring-loaded cam retainer 452 is made of a material that is sturdy but capable of deflection. For example, the spring-loaded cam retainer 452 may be made of a relatively thin piece of metal. FIGS. 4C-4E show various aspects of the mounting assembly 450. FIG. 4C is a side view of the connection portion 451. FIG. 4D is a view of the connection portion 451 in the X-Y plane. FIG. 4E is a perspective view of the release lever 453.

The release lever 453 includes an arm 457 that extends from a first end 458 to a second end 459 (FIG. 4E). The first end 458 is mounted to the base 280 at a pivot point 483. The arm 457 is able to rotate about the pivot point 483 in the Y-Z plane. The release lever 453 also includes a rod 456 at the second end 459. The rod 456 extends perpendicularly to the arm 457.

The connection portion 451 is a rigid piece that connects to the lower portion 241 of the cutout 240. The connection portion 451 includes an opening 460. The fastener 262 passes through the opening 460 and the opening 246 (on the cutout 240) to secure the connection portion 451 to the lower portion 241 of the cutout 240.

The spring-loaded cam retainer 452 is attached to the connection portion 451 by fasteners 464. The spring-loaded cam retainer 452 includes a hook portion 454. Referring also to FIG. 4D, the connection portion 451 and the hook portion 454 are substantially U-shaped in the X-Y plane such that there is an open central region 462 in the connection portion 451.

Figure 4G:
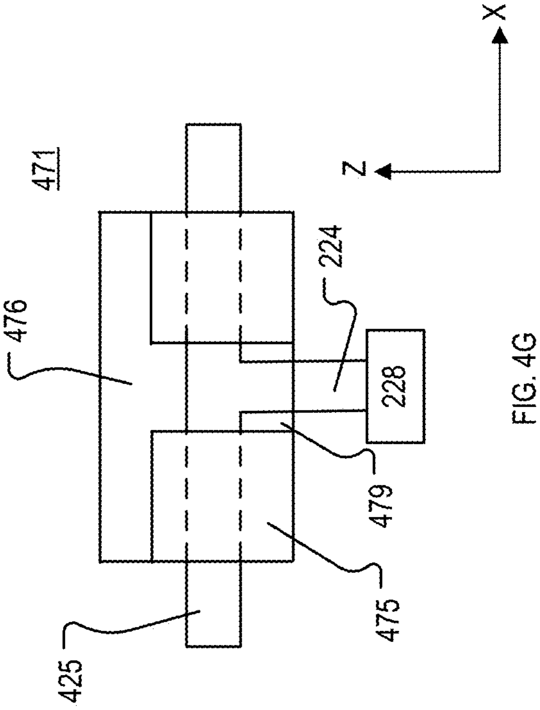
FIGS. 4F and 4G show various aspects of another mounting assembly.
Figure 4F:
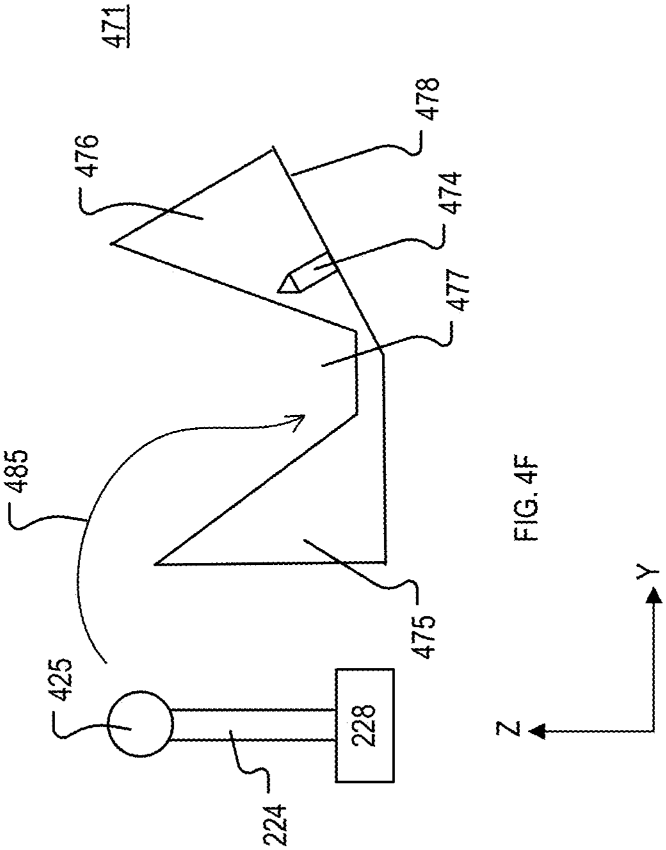

Referring also to FIGS. 4F and 4G, the second mounting assembly 470 includes a pivot body 471. FIG. 4F shows a cross-sectional view of the pivot body 471 in the Y-Z plane. FIG. 4G shows a side view of the pivot body 471 in the X-Z plane. In FIG. 4G, hidden lines are shown with a dashed line style. The pivot body 471 includes a first portion 475, a second portion 476, and a recess 477 between the first portion 475 and the second portion 476.

A bore 474 extends into the second portion 476 of the pivot body 471 from a side 478. The bore 474 aligns with the opening 247 of the upper portion 242 of the cutout 240. The pivot body 471 is secured to the upper portion 242 by passing a bolt or screw through the opening 247 in the upper portion 242 of the cutout 240 and into the bore 474.

A slot 479 (FIG. 4G) provides an opening that passes through the first portion 475 to the recess 477. The slot 479 and the recess 477 are sized to accept and hold the terminal 224 and the rod structure 425, respectively. The terminal 224 and the rod structure 425 are moved along an arrow 485 (FIG. 4F) and placed into the recess 477 and the slot 479. FIG. 4G shows the terminal 224 in the slot 479 and the rod structure 425 in the recess 477.

Referring again to FIG. 4A, when the body 220 is attached to the cutout 240, the rod 456 of the release lever 453 engages an outer side of the hook portion 454 and the arm 457 is in the open region 462 (FIG. 4D). To release the body 220 from the cutout 240, the release lever 453 is rotated about the pivot point 483 until the rod 456 is clear of the hook portion 454. Referring again to FIGS. 4F and 4G, when the first end 226 of the body 220 is not connected to the cutout 240, the rod structure 425 rotates in the recess 477 (of the second mounting assembly 270), and the terminal 222 and the body 220 rotate or pivot in the Y-Z plane such that the first end 226 of the body 220 falls away from the cutout 240. FIG. 4B shows this condition. The body 220 may be pressed back into the cutout 240 by pressing the body 220 at push point 488 such that the release lever 453 again engages the hook portion 454. The push point 488 may be configured to engage with a hot stick such that an operator can push the body 220 into the cutout 240 from a safe and/or convenient location.

Thus, the mounting assemblies 450 and 470 allow the first end 226 of the body 220 to swing away from the lower portion 241 of the cutout 240 while the terminal 224 remains attached to the upper portion 242 of the cutout 240. The mounting assemblies 450 and 470 may improve the overall efficiency and ease of use of the apparatus 410. For example, the body 220 may be easier to install into the cutout 240 with a hot stick because the hot stick is pushed under the center of gravity of the body 220. Moreover, the mounting assemblies 450 and 470 may be used as part of a retrofit to adapt an apparatus that was originally intended to be pole-mounted into an apparatus that can be mounted to a cutout.

Figure 5A:
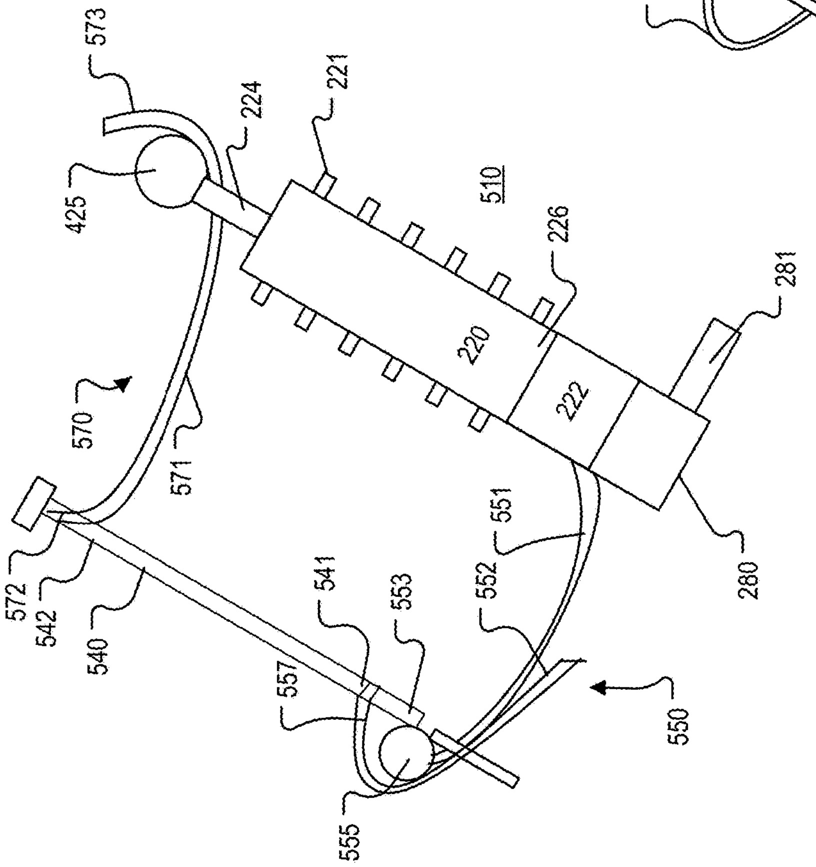
Figure 6:
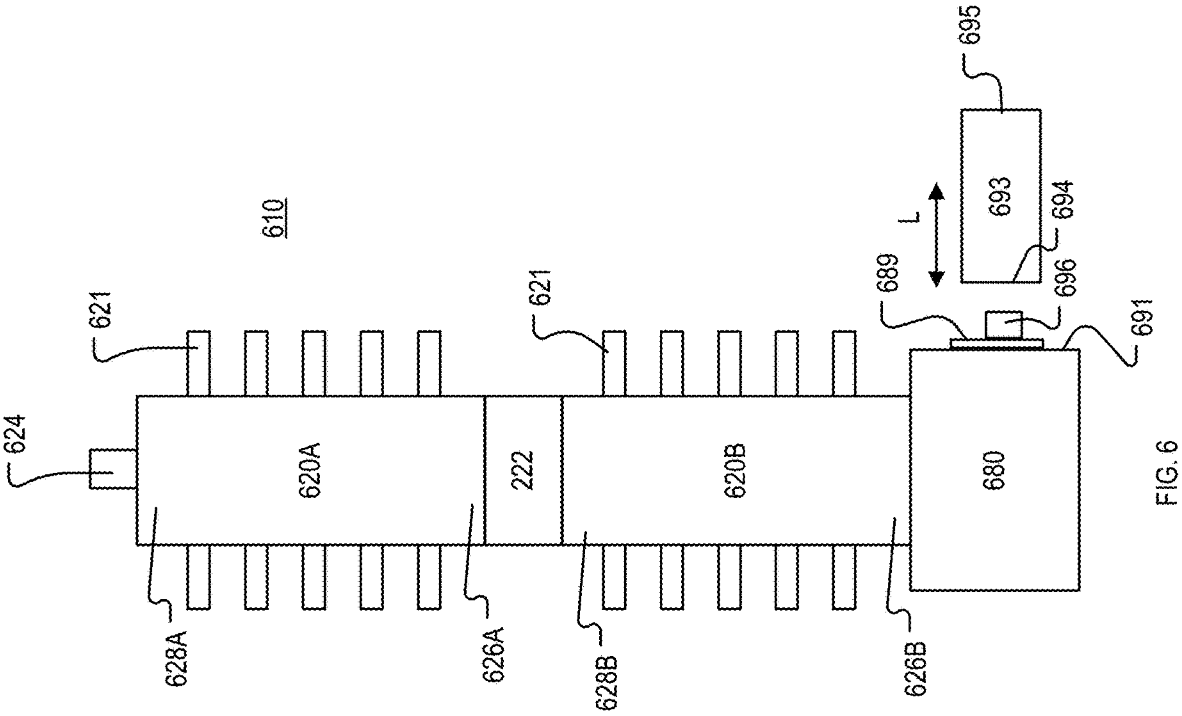

FIG. 5A is a side view of an apparatus 510 in a locked state. FIG. 5B is a side view of the apparatus 510 in a released state. The apparatus 510 is another implementation of the apparatus 410. The apparatus 510 includes the body 220, the terminals 222 and 224, and the rod structure 425. The apparatus 510 also includes a first mounting assembly 550 and a second mounting assembly 570, and a connection portion 551 that is connected to one of the openings 223 on the terminal 222. The first mounting assembly 550 and the second mounting assembly 570 connect the body 220 to an insulating mounting structure 540. When the first mounting assembly 550 is locked (FIG. 5A), an end 555 of the connection portion 551 is held in a loop region 557 by a release mechanism 553. When the first mounting assembly 550 is released (such as shown in FIG. 5B), the rod structure 425 and the body 220 rotate in the Y-Z plane, and the first end 226 of the body 220 swings away from the insulating mounting structure 540.

Figure 5D:
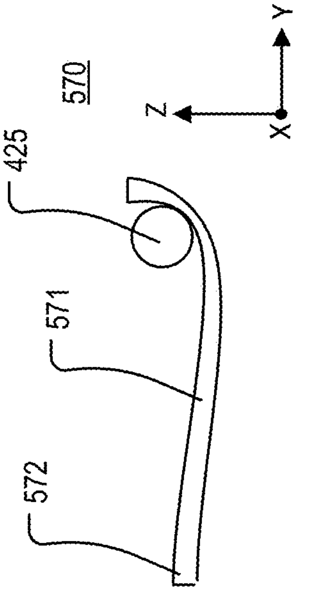
FIGS. 5C and 5D show various aspects of another mounting assembly.
Figure 5F:
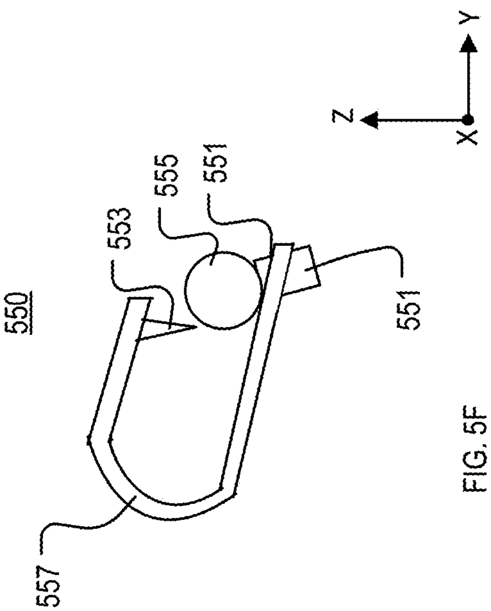
FIGS. 5E and 5F show various aspects of another mounting assembly.
Figure 5C:
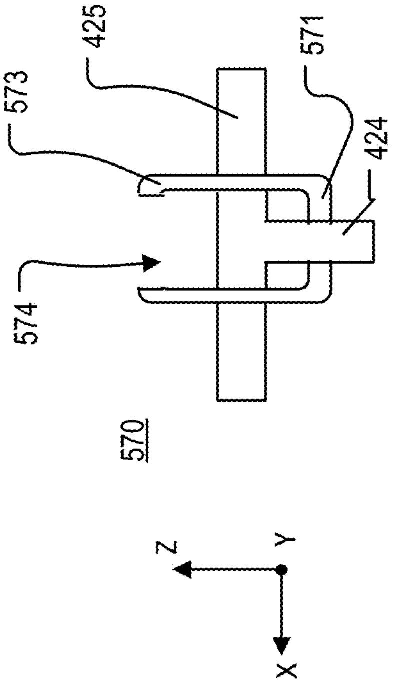
Figure 5E:
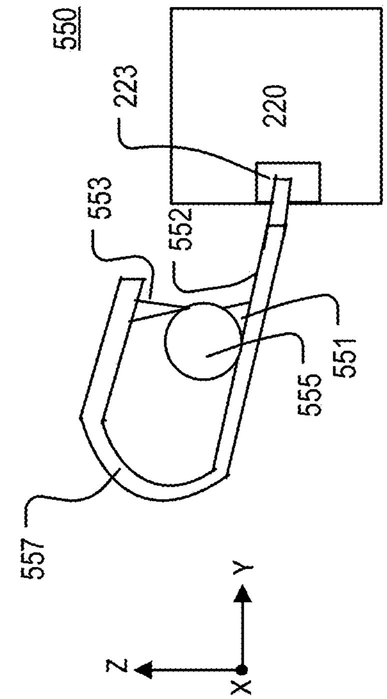

FIGS. 5C and 5D are front and side views, respectively, of the second mounting assembly 570. FIG. 5E shows the first mounting assembly 550 in a locked position. FIG. 5F shows the first mounting assembly 550 in a released position. The second mounting assembly 570 includes a connection portion 571 that extends from a first end 572 to a curved end 573. The first end 572 is attached to an upper portion 542 of the insulating mounting structure 540. The first end 572 may be attached to the upper portion 542 with, for example, a bolt or other fastener. The connection portion 571 extends from the first end 572 and curves or tilts slightly downward (in the −Z direction) and then curves upward (in the Z direction) to the curved end 573. The connection portion 571 is a track with an open central region 574. The terminal 424 fits in the open region 574, and the curved end 573 retains the rod structure 425. When the first mounting assembly 550 is released, the rod structure 425 is retained by the curved end 573, and the rod structure 425 and the body 220 rotate in the Y-Z plane.

Referring to FIG. 5E, the first mounting assembly 550 includes the loop region 557, a frictional track 552, and a release mechanism 553. The loop region 557 forms a semi-circular opening at a lower portion 541 of the insulating mounting structure 540. In the locked position (FIGS. 5A and 5E), the release mechanism 553 retains the end 555 of the connection portion 551 in the loop region 557. The release mechanism 553 holds the end 555 in the locked state (FIGS. 5A and 5E) and releases the end 555 in the released state (FIGS. 5B and 5F). The release mechanism 553 may be, for example, a latch or hinged retainer, that engages the end 555 in the locked state such that the end 555 is retained in the loop region 557. The release mechanism 553 moves out of the path of the end 555 in the released state to allow the end 555 to move along the frictional track 552 and leave the loop region 557.

After the release mechanism 553 changes to the released state, the end 555 moves along the frictional track 552 as the rod structure 425 and body 220 rotate in the Y-Z plane. The frictional track 552 inhibits or damps the motion of the end 555 (and thus also damps the motion of the body 220). By damping the motion, the frictional track 552 eliminates or reduces the possibility of overshoot. Furthermore, by damping the motion, the frictional track also eliminates or reduces the possibility of the body 220 swinging back into the locked position inadvertently. Therefore, the frictional track 552 also protects the switch 112 and the components 113 from electrical shock and damage. Moreover, in the implementation shown in FIGS. 5A and 5B, the apparatus 510 may be dropped in onto the connection portion 571 and will drop onto the frictional track 552. Thus, the configuration shown in FIGS. 5A and 5B improves the efficiency of installation and replacement of the apparatus 510.

Any of the connection assemblies 150 and 170, 250 (or 350) and 270, 450 and 470, or 550 and 570 discussed above may be used to connect a switching apparatus such as a single-phase recloser to an insulated mounting bracket. Moreover, any of the above connection assemblies 150 and 170, 250 (or 350) and 270, 450 and 470, or 550 and 570 may be used with a switching apparatus that is configured to connect to either a utility structure or an insulating mounting bracket. A utility structure is a large structure in the electrical distribution system that is typically intended to be permanent. Examples of a utility structure include a wooden utility pole, any other type of large pole, or a concrete structure.

Referring to FIGS. 6 and 7 any of the above connection assemblies 150 and 170, 250 (or 350) and 270, 450 and 470, or 550 and 570 may be used with a switching apparatus 610 shown in FIG. 6 or a switching apparatus 710 shown in FIG. 7. Specifically, any of the above connection assemblies 150 and 170, 250 (or 350) and 270, 450 and 470, or 550 and 570 may be used to connect the switching apparatus 610 or the switching apparatus 710 to an insulating mounting bracket. The insulating mounting bracket may be a fuse cutout mounting bracket. As discussed below, the switching apparatuses 610 and 710 are also capable of being attached to a utility structure. Thus, the switching apparatuses 610 and 710 have a dual-mounting or universal mounting capability.

FIG. 6 shows a side view of the switching apparatus 610. The switching apparatus 610 includes a grounded tank 680 or base 680. The switching apparatus 610 includes an upper housing 620A and a lower housing 620B. The upper housing 620A and the lower housing 620B are three-dimensional objects that are made of an electrically insulating material. The upper housing 620A and the lower housing 620B include insulating sheds 621 that extend radially outward from the bodies 620A and 620B. The sheds 621 are used to increase the withstand voltage of the switching apparatus 610 so that the switching apparatus 610 is able to withstand faults while remaining mounted to the utility structure.

The upper housing 620A extends in the Z direction from a first end 626A to a second end 628A. A second electrical terminal 624 extends through the second end 628A of the upper housing 620A. The electrical terminal 222 is attached to the first end 626A. The electrical terminal 222 and the second terminal 624 are electrically connected to a switch (not shown) that is inside the upper housing 620A. The switch is similar to the switch 112 discussed above.

The lower housing 620B extends in the Z direction from a first end 626B to a second end 628B. The second end 628B is mounted to the terminal 222. The first end 626B is mounted to the tank 680. The lower housing 620B provides electrical isolation between the terminal 222 and the tank 680, and the tank 680 is a grounded tank.

The tank 680 includes a mechanical interface 689 that is configured to attach the tank 680 to a utility structure. In the example shown in FIG. 6, the mechanical interface 689 is a connection point on an exterior surface 691. The mechanical interface 689 connects to a rigid support 693. The rigid support 693 extends from a first end 694 to a second end 695. The rigid support 693 is any rigid body capable of supporting the switching apparatus 610 and holding it to a utility structure. Because the tank 680 is grounded, the rigid support may be made of an electrically conductive material. For example, the rigid support 693 may be a steel bracket or a bracket made of another metal material. The rigid support 693 may be made of an electrically insulating material, such as a rugged polymer that may or may not include insulating sheds.

The first end 694 connects to the mechanical interface 689 by a temporary but secure attachment mechanism 696. The mechanism 696 is sufficiently sturdy to hold the rigid support 693 to the mechanical interface 689. Moreover, the attachment mechanism 696 also allows the rigid support 693 to be removed from the mechanical interface 689 without damaging the mechanical interface 689, the tank 680, or the rigid support 693. The attachment mechanism 696 may be, for example, a screw and corresponding bore, a block or post and corresponding opening, or any other mechanical fastener. The attachment mechanism 696 allows the rigid support 693 to be repeatedly attached to and removed from the tank 680, for example, along a path L.

This configuration allows the switching apparatus 610 to be easily converted into a switching apparatus that is mountable to an insulating mounting bracket (with the mounting assemblies 150 and 170, 250 (or 350) and 270, 450 and 470, or 550 and 570) into a switching apparatus that is mountable to a utility structure. Therefore, the usability of the switching apparatus 610 is enhanced and the end user realizes cost and time savings.

FIG. 7 is a side view of the switching assembly 710. The switching assembly 710 includes a housing 720 that extends from a first end 726 to a second end 728. The housing 720 is a three-dimensional body that is made of an electrically insulating material. Insulating sheds 721 extend outward from an exterior surface of the housing 720. The first end 726 is attached to the terminal 222, and a terminal 724 extends through the second end 728. The housing encloses a switch (not shown in FIG. 7 but similar to the switch 112). The switch is electrically connected to the terminal 724 and the terminal 722.

The switching assembly 710 includes a tank 780 that is coupled to the terminal 222. The tank 780 is ungrounded. The tank 780 includes a mechanical interface 789 that is configured to attach the tank 780 to a utility structure. The mechanical interface 789 connects to a rigid support 793. The rigid support 793 extends from a first end 794 to a second end 795. Because the tank 780 is ungrounded, the rigid support 793 is made of an electrically insulated material and may include insulating sheds. The rigid support 793 is any electrically insulating rigid body capable of supporting the switching apparatus 710 and holding it to a utility structure.

The first end 793 connects to the mechanical interface 789 by a temporary but secure attachment mechanism 796 that is sufficiently sturdy to hold the rigid support 793 to the mechanical interface 789. Moreover, the attachment mechanism 796 also allows the rigid support 793 to be removed from the mechanical interface 789 without damaging the mechanical interface 789, the tank 780, or the rigid support 793. The attachment mechanism 796 may be, for example, a screw and corresponding bore, a block or post and corresponding opening, or any other mechanical fastener. The attachment mechanism 796 allows the rigid support 793 to be repeatedly attached to and removed from the tank 780, for example, along a path L.

This configuration allows the switching apparatus 710 to be easily converted into a switching apparatus that is mountable to an insulating mounting bracket (with the mounting assemblies 150 and 170, 250 (or 350) and 270, 450 and 470, or 550 and 570) into a switching apparatus that is mountable to a utility structure. Therefore, the usability of the switching apparatus 710 is enhanced and the end user realizes cost and time savings.

The mechanical interfaces 689 and 789 are examples of interfaces, and other types of interfaces may be used. For example, and referring to FIG. 8, the interface may be a connection strap 899 that encircles the tank. Other implementations are possible. For example, the interface may be a bracket that partially surrounds the tank or that mounts to three sides or two of the tank. In another example, the implementation shown in FIG. 2 includes the connection assemblies 250 and 270, which hold the apparatus 210 to the cutout 240 in a fixed manner such that the apparatus 210 does not move relative to the cutout 240. However, other implementations are possible. For example, the second connection assembly 270 may be replaced with the second connection assembly 470 or the second connection assembly 570 such that the second end 226 of the body is able to move relative to the cutout or other supporting structure. Such a configuration may be easier to install into a cutout and may be used as a retrofit kit to adapt a pole-mounted design to fit into a cutout.

In implementations in which the body 120 or 220 is intended for connection only to an insulated mounting bracket that allows the body to drop out, the body 120 or 220 may be implemented without insulating sheds. An insulated mounting bracket that allows the body or the switching apparatus to drop out may be referred to as a visible break mounting bracket.

Figure 9:
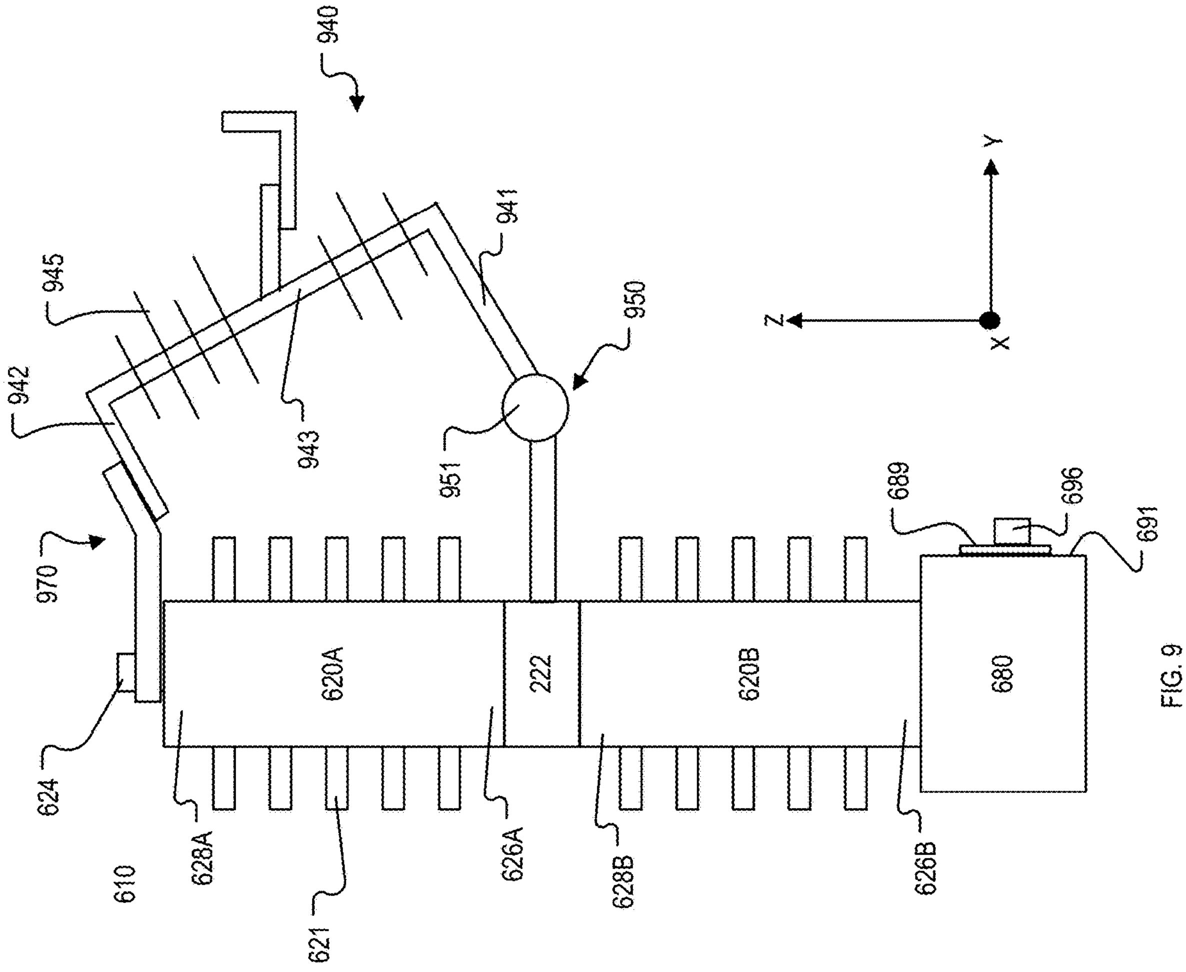
FIG. 9 shows the switching apparatus of FIG. 6 mounted to a cutout mount.

Any of the switching apparatuses discussed above may be configured to mount to a utility structure or an insulating mounting bracket. Referring to FIG. 9, the insulating mounting bracket may be a traditional cutout mounting. FIG. 9 shows the switching apparatus 610 mounted to a traditional cutout mounting 940. The cutout mounting 940 is substantially C-shaped and includes a lower portion 941 and an upper portion 942. A connecting portion 943 extends between the lower portion 941 and the upper portion 942. Insulating sheds 945 extend radially outward from the connection portion 943.

The terminal 624 is connected to the upper portion 942 of the cutout mounting 940 by a mounting assembly 970 and to the lower portion 941 by a mounting assembly 950. The mounting assembly 970 is any type of mechanism that allows the terminal 624 to be released from the upper portion 942 so that the switching apparatus 610 drops out of the cutout mounting 940. The mounting assembly 950 is any type of mechanism that includes a pivot 951 that enables the switching apparatus to swing about an arc in the Y-Z plane. The mounting assembly 950 and/or the mounting assembly 970 may have various aspects of the mounting assemblies discussed above or may be assemblies that are known in the art.

Figure 10A:
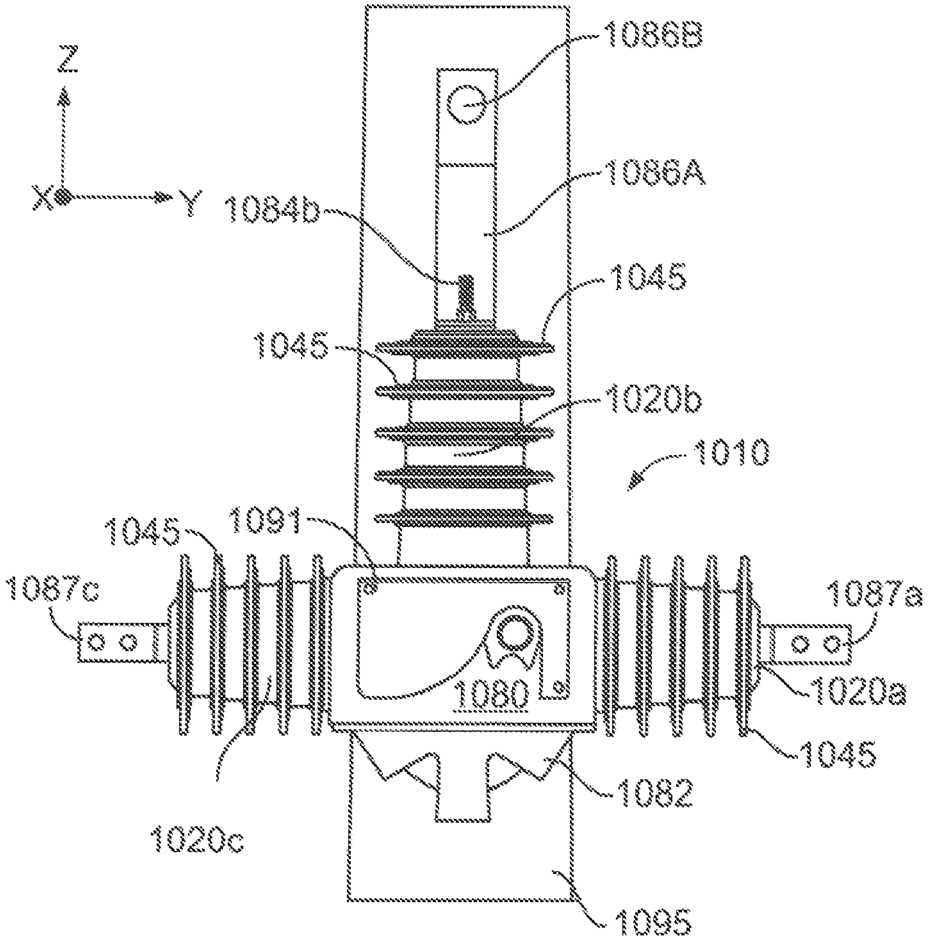
FIG. 10A is a front exterior view of another switching apparatus mounted to a utility pole.
Figure 10B:
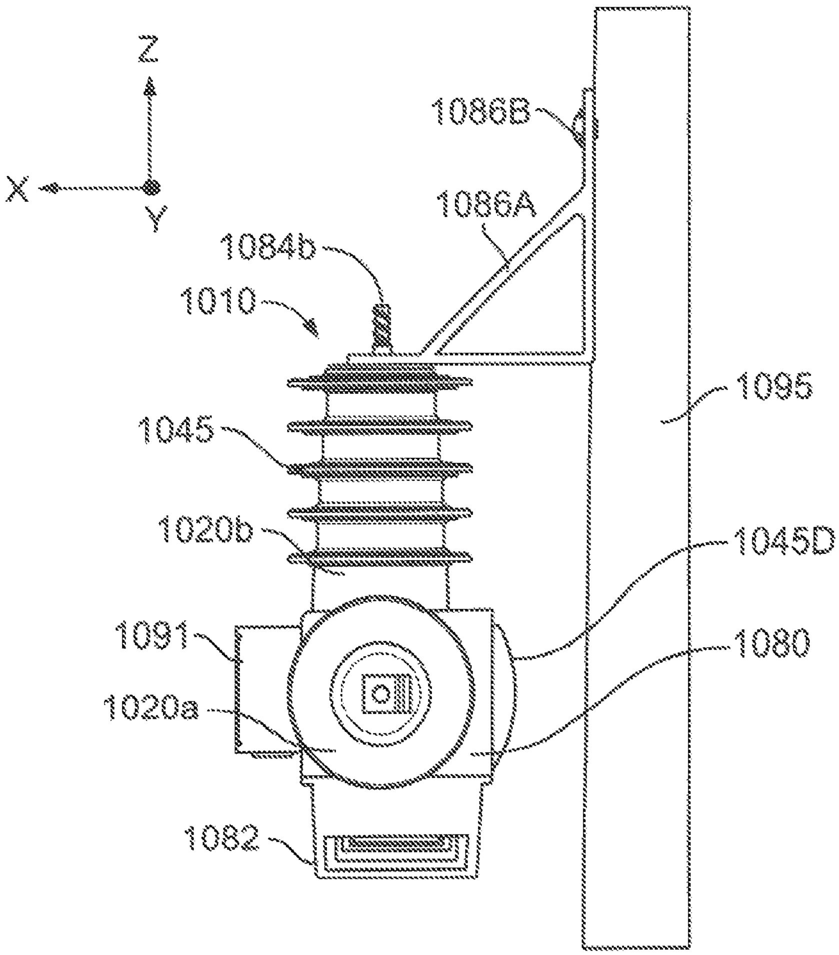
FIG. 10B is an exterior view of the switching apparatus of FIG. 10A.
Figure 10C:
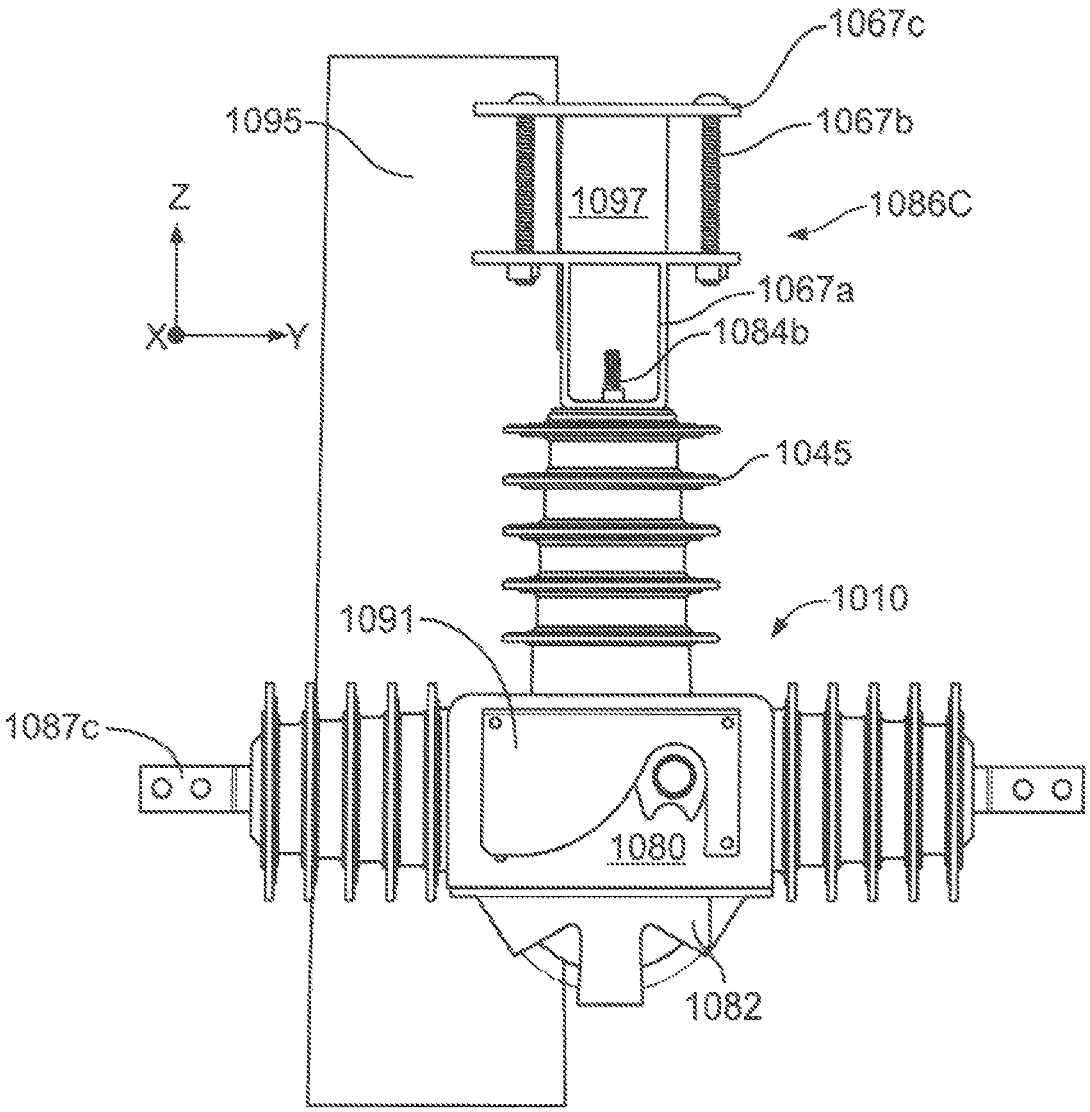
FIG. 10C is a front exterior view of the switching apparatus of FIG. 10A mounted to a cross-arm.
Figure 10D:
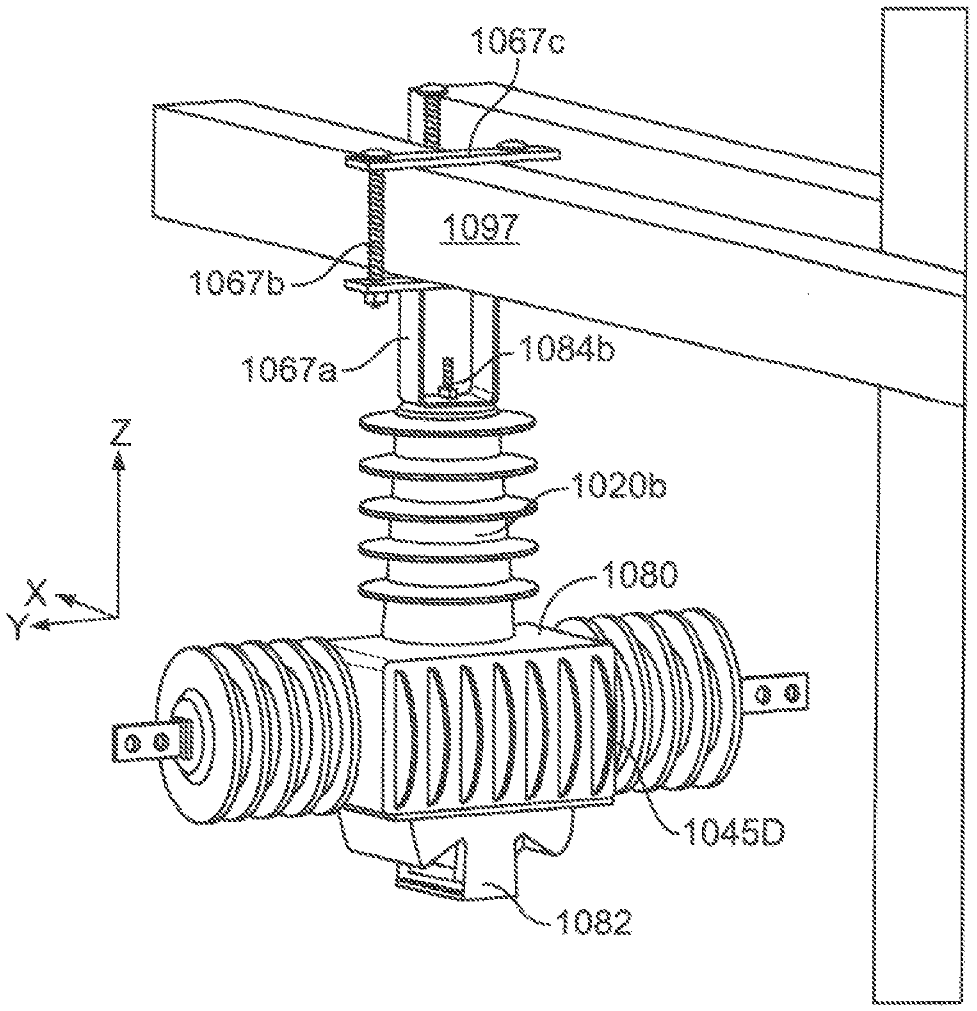
FIG. 10D is a rear perspective view of the switching apparatus of FIG. 10C.
Figure 10E:
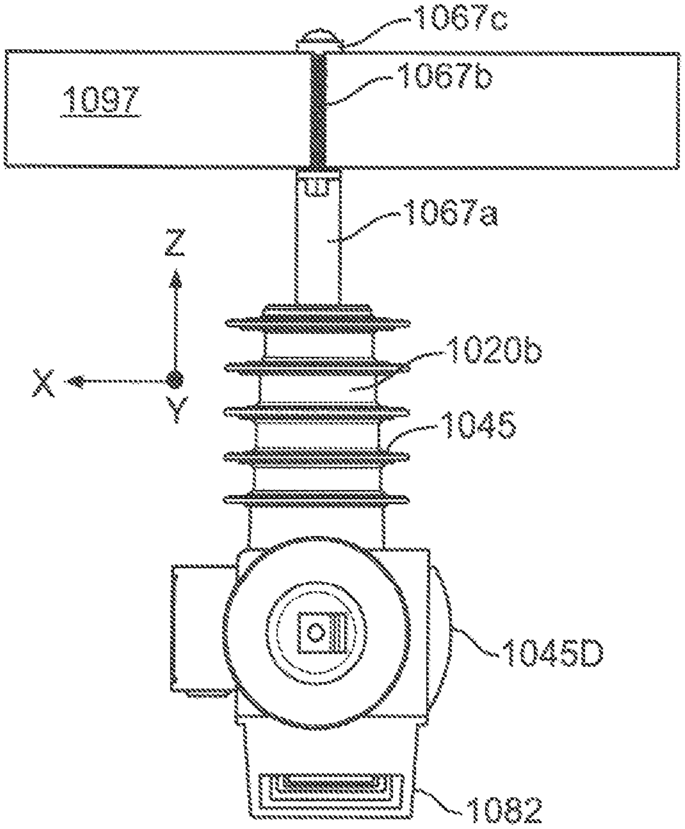
FIG. 10E is a side exterior view of the switching apparatus of FIG. 10C.

FIGS. 10A-10E show various views of a switching apparatus 1010. The switching apparatus 1010 may be mounted to more than one type of structure in the high-power electrical distribution system 100 (FIG. 1). For example, the switching apparatus 1010 may be mounted to a utility pole (such as shown in FIGS. 10A and 10B) or to a cross-arm (such as shown in FIGS. 10C-10E). FIG. 10A is a front exterior view of the switching apparatus 1010 mounted to a utility pole 1095. FIG. 10B is a side exterior view of the switching apparatus 1010 mounted to the utility pole 1095. FIG. 10C is a front exterior view of the switching apparatus 1010 mounted to a cross-arm 1097. FIG. 10D is a rear perspective view of the switching apparatus 1010 mounted to the cross-arm 1097. FIG. 10E is a side exterior view of the switching apparatus 1010 mounted to the cross-arm 1097.

Referring to FIGS. 10A and 10B, the switching apparatus 1010 includes a tank 1080. The tank 1080 is a live or ungrounded tank. The switching apparatus 1010 is a single-phase recloser that includes an interrupting mechanism, for example, a vacuum interrupter, switchgear, or fault interrupter; a current transformer; and an embedded control. The recloser also includes supporting accessories and associated devices, such as, for example, a power supply, and may also include other components and devices such as, for example, communications interfaces, and measurement devices aside from the current transformer. The embedded control may communicate with a remote station such as the remote station 199 of FIG. 1. The interrupting mechanism may include, for example, an actuator, a mechanism, an operating rod, and a current exchange, and also may include additional associated devices and components. The various components of the interrupting mechanism are not shown in FIGS. 10A-10D.

The switching apparatus 1010 also includes bodies 1020*a*, 1020*b*, and 1020*c*. The interrupting mechanism may be located in the body 1020*a* or the body 1020*c*. In other words, in some implementations, the interrupting mechanism is in the body 1020*c*, and in some implementations, the interrupting mechanism is in the body 1020*a*. The embedded control and the current transformer may be in the tank 1080. The current transformer can be enclosed in the body 1020*a* or the body 1020*c*, depending on where the interrupting mechanism is located. The current transformer may be paired with the interrupting mechanism in the body 1020*a* or the body 1020*c*, or may be placed around the conductor in whichever of the body 1020*a* or the body 1020*c* does not contain the interrupting mechanism. The embedded control may be in the tank 1080. The body 1020*b* may contain the actuator and mechanism. Some or all of the actuator and mechanism may be in either the body 1020*b* or the tank 1080.

Other implementations are possible. For example, the interrupting mechanism may be in the body 1020*b* and some of the actuator and mechanism may be in either the body 1020*a* or the 1020*c*. Moreover, in implementations in which the interrupting mechanism and current transformer are in the body 1020*a* or the body 1020*c*, the body 1020*b* may also be used for voltage sensing or power harvesting. For example, one or more high-impedance resistors may be embedded in the body 1020*b* to facilitate voltage sensing and/or power harvesting.

The switching apparatus 1010 also includes a sleet shield 1091, which is mounted on an exterior of the tank 1080. The sleet shield includes a manual operating handle and a second handle (not shown) for hot line tag.

Each body 1020*a*, 1020*b*, 1020*c* is a three-dimensional body made of an electrically insulating material. For example, the bodies 1020*a*, 1020*b*, 1020*c* may be made of ceramic or a polymer. The body 1020*b* extends from the tank 1080 in the Z direction to a mounting location 1084*b*, which extends from the body 1020*b*. The mounting location 1084*b* is connected to a mounting bracket 1086A. The mounting bracket 1086A is an L-shaped mounting bracket that mounted to the utility pole 1095 with a fastening device 1086B, for example, a bolt, nail, or screw. When the mounting bracket 1086A is connected to the utility pole 1095, the switching apparatus 1010 is mounted to the utility pole 1095. The body 1020*a* extends from the tank 1080 in the Y direction to a source/load connection point 1087*a*, and the body 1020*c* extends from the tank 1080 in the −Y direction to a source/load connection point 1087*c*. Each of the bodies 1020*a*, 1020*b*, 1020*c* include sheds 1045 that extend radially outward.

The switching apparatus 1010 also includes an open/close indicator 1082. The open/close indicator 1082 is coupled to the interrupting mechanism/mechanism/actuator assembly and provides a visible indication of whether the interrupting mechanism is open (the contacts of the interrupting mechanism are separated) or closed (the contacts of the interrupting mechanism are in physical contact). The open/close indicator 1082 is on the lower or bottom side of the tank 1080 when the switching apparatus 1010 is mounted on the utility pole 1095. This orientation enhances the visibility of the open/close indicator 1082 for an operator that views the switching apparatus 1010 from below.

Referring to FIGS. 10C, 10D and 10E, the switching apparatus 1010 is shown mounted to a cross-arm 1097. The cross-arm 1097 is mounted to another structure in the power system 100, such as a utility pole. In the example shown in FIGS. 10C, 10D, and 10E, the cross-arm 1097 extends along the X direction (into and out of the page in FIG. 10C) and is attached to the utility pole 1095, which extends along the Z direction. The cross-arm 1097 is a solid rod-like structure with a rectangular or square cross-section.

A mounting bracket 1086C is used to mount the switching apparatus 1010 to the cross-arm. The mounting bracket 1086C attaches to the mounting location 1084*b*. When attached to the mounting location 1084*b*, the mounting bracket 1086C extends in the Z direction. The mounting bracket 1086C includes a base portion 1067*a*, a mid-portion 1067*b*, and a top portion 1067*c*. The base portion 1067*a* connects to the mounting location 1084*b*. The base portion 1067*a* may have, for example, an opening that receives the mounting location 1084*b* such that the mounting location 1084*b* is secured to the base portion 1067*a* with, for example, a nut. The mid-portion 1067*b* is connected to the base portion 1067*a*. In the example shown, the mid-portion 1067*b* is a plurality of rods or bolts. The top portion 1067*c* is a substantially flat piece that extends in the X-Y plane and connects to the mid-portion 1067*b*. The top portion 1067*c* is connected to the mid-portion 1067*b*. When joined together, part of the base portion, the mid-portion 1067*b*, and the top portion 1067*c* surround the cross-arm 1097 such that the switching apparatus 1010 is mounted to the cross-arm 1097. Other implementations are possible. For example, the mid-portion 1067*b* and the top portion 1067*c* may be a single piece that is configured to connect to the base portion 1067*a* and to surround and hold the cross-arm 1097.

Referring to FIG. 10D, which is a rear perspective view of the switching apparatus 1010, the tank 1080 also includes sheds 1045D on a side of the tank 1080 opposite the sleet shield 1091. The sheds 1045D may be used, for example, to provide a visible indication that the tank 1080 is live.

In sum, the switching apparatus 1010 may be mounted to the pole 1095 or the cross-arm 1097. The mounting bracket 1086A is connected to the mounting location 1084*b* to mount the switching apparatus 1010 to the utility pole 1095. The mounting bracket 1086C is connected to the mounting location 1084*b* to mount the switching apparatus 1010 to the cross-arm 1097.

Other features are within the scope of the claims. For example, the L-shaped mounting bracket 1086A and the clamp-mounting bracket 1086C are provided as examples of mounting assemblies that may be used to mount the switching assembly 1010 to a structure in a high-power electrical system. Other forms of mounting assemblies may be used.

What is claimed is:

1. A switching apparatus comprising:

a body comprising:

a sidewall that extends from a first end to a second end, the sidewall defining an interior space;

a mounting interface; and a plurality of electrically insulating sheds that extend radially outward from an exterior surface of the sidewall;

a circuit interrupter in the interior space of the body;

a first terminal electrically connected to the circuit interrupter;

a second terminal electrically connected to the circuit interrupter; and a mounting system comprising:

a first mounting assembly attached to the first terminal; and a second mounting assembly attached to the second terminal, wherein the mounting interface is not attached to the first terminal or the second terminal, and is configured to mechanically connect to a first type of mounting structure, and the first mounting assembly and the second mounting assembly are configured to mechanically connect to a second type of mounting structure that is different from the first type of mounting structure such that the switching apparatus is configured to be mechanically connected to at least two different types of mounting structures, wherein the body further comprises a tank;

the at least two different types of mounting structures comprise an electrically insulating bracket and a utility structure, the utility structure is the first type of mounting structure, the electrically insulating bracket is the second type of mounting structure;

the mounting interface comprises a mechanical interface configured to connect to a support, the support configured to attach the tank to the utility structure;

the tank is grounded; and the mechanical interface is configured to attach to an electrically conductive support.

2. The switching apparatus of claim 1, wherein the utility structure comprises one or more of a utility pole and a cross-arm mounted to a utility pole.

3. The switching apparatus of claim 1, wherein the mechanical interface comprises a mounting strap that surrounds an exterior of the tank.

4. The switching apparatus of claim 1, wherein the mechanical interface comprises a connection point on an exterior surface of the tank, and the connection point is configured to allow the mounting structure to be attached to the tank at the mechanical interface and removed from the tank without damaging the tank, the mechanical interface, or the support.

5. The switching apparatus of claim 1, wherein the electrically insulated bracket comprises a visible break mounting bracket or a cutout that lacks a fuse.

6. The switching apparatus of claim 1, wherein:

the first mounting assembly is configured to connect the first terminal to a lower portion of the electrically insulating bracket; and the second mounting assembly is configured to connect the second terminal to an upper portion of the electrically insulating bracket.

7. The switching apparatus of claim 6, wherein one or more of the first mounting assembly and the second mounting assembly are configured to allow the body to move relative to the electrically insulating bracket.

8. The switching apparatus of claim 1, wherein the circuit interrupter comprises a switch capable of repeatedly opening and closing, and the switching apparatus comprises a single-phase recloser.

9. The switching apparatus of claim 8, wherein the circuit interrupter comprises a vacuum interrupter.

10. A system comprising:

an insulating mounting structure comprising: an upper portion, a lower portion, and a middle portion that extends between the upper portion and the lower portion, wherein the upper portion, the lower portion, and the middle portion are a single piece of electrically insulating material;

a switching apparatus comprising: a body that extends along a direction from a first end to a second end, a first terminal, a second terminal that extends from the second end along the direction, and a circuit interrupter electrically connected to the first terminal and the second terminal;

a first mounting assembly configured to connect the first terminal to the lower portion of the insulating mounting structure; and a second mounting assembly configured to mechanically connect the second terminal to an upper portion of the insulating mounting structure, wherein, the first mounting assembly does not permit the body to rotate about the lower portion of the insulating mounting structure, wherein the system further comprises a damping apparatus configured to damp intentional movement of the body relative to the insulating mounting structure.

11. The system of claim 10, wherein the damping apparatus is part of one or more of the first mounting assembly and the second mounting assembly, and the damping apparatus is configured to damp one or more of intentional rotational motion or translational motion of the body.

12. The system of claim 10, wherein the damping apparatus comprises a frictional region configured to engage a connection portion coupled to the switching apparatus.

13. The system of claim 10, wherein the first mounting assembly prevents the switching apparatus from dropping out of the insulating mounting structure.

14. A switching apparatus comprising:

a body comprising:

a sidewall that extends from a first end to a second end, the sidewall defining an interior space; and a plurality of electrically insulating sheds that extend radially outward from an exterior surface of the sidewall;

a grounded tank coupled to the body;

a circuit interrupter in the interior space of the body;

a first terminal electrically connected to the circuit interrupter; and a second terminal electrically connected to the circuit interrupter, wherein the switching apparatus is configured to be mechanically connected to at least two different types of mounting structures, and wherein the switching apparatus further comprises:

a mounting interface configured to attach to the grounded tank, and wherein the at least two different types of mounting structures comprise a utility structure and an insulated bracket, and the mounting interface is configured to attach the switching apparatus to the utility structure; and wherein the mounting interface is made of an electrically conductive material.

15. A switching apparatus comprising:
a body comprising:
a sidewall that extends from a first end to a second end, the sidewall defining an interior space;
a mounting interface; and
a plurality of electrically insulating sheds that extend radially outward from an exterior surface of the sidewall;
a circuit interrupter in the interior space of the body;
a first terminal electrically connected to the circuit interrupter;
a second terminal electrically connected to the circuit interrupter; and
a mounting system comprising:
a first mounting assembly attached to the first terminal; and
a second mounting assembly attached to the second terminal, wherein
the mounting interface is not attached to the first terminal or the second terminal, and is configured to mechanically connect to a first type of mounting structure, and
the first mounting assembly and the second mounting assembly are configured to mechanically connect to a second type of mounting structure that is different from the first type of mounting structure such that the switching apparatus is configured to be mechanically connected to at least two different types of mounting structures, wherein
the body further comprises a tank, the tank comprising an ungrounded tank or a grounded tank;
the at least two different types of mounting structures comprise an electrically insulating bracket and a utility structure, the utility structure is the first type of mounting structure, the electrically insulating bracket is the second type of mounting structure, and the mounting interface comprises a mechanical interface configured to connect to a support, the support configured to attach the tank to the utility structure; and
the mechanical interface comprises a mounting strap that surrounds an exterior of the tank.

16. The switching apparatus of claim 15, wherein the tank is ungrounded, and the mechanical interface is configured to attach to an insulated support.

17. The switching apparatus of claim 15, wherein the tank is grounded, and the mechanical interface is configured to attach to an electrically conductive support.

18. A switching apparatus comprising:
a body comprising:
a sidewall that extends from a first end to a second end, the sidewall defining an interior space;
a mounting interface; and
a plurality of electrically insulating sheds that extend radially outward from an exterior surface of the sidewall;
a circuit interrupter in the interior space of the body;
a first terminal electrically connected to the circuit interrupter;
a second terminal electrically connected to the circuit interrupter; and
a mounting system comprising:
a first mounting assembly attached to the first terminal; and
a second mounting assembly attached to the second terminal, wherein
the mounting interface is not attached to the first terminal or the second terminal, and is configured to mechanically connect to a first type of mounting structure, and
the first mounting assembly and the second mounting assembly are configured to mechanically connect to a second type of mounting structure that is different from the first type of mounting structure such that the switching apparatus is configured to be mechanically connected to at least two different types of mounting structures, wherein
the body further comprises a tank, the tank comprising an ungrounded tank or a grounded tank;
the at least two different types of mounting structures comprise an electrically insulating bracket and a utility structure, the utility structure is the first type of mounting structure, the electrically insulating bracket is the second type of mounting structure, and the mounting interface comprises a mechanical interface configured to connect to a support, the support configured to attach the tank to the utility structure; and
the mechanical interface comprises a connection point on an exterior surface of the tank, and the connection point is configured to allow the mounting structure to be attached to the tank at the mechanical interface and removed from the tank without damaging the tank, the mechanical interface, or the support.

19. The switching apparatus of claim 18, wherein the tank is ungrounded, and the mechanical interface is configured to attach to an insulated support.

20. The switching apparatus of claim 19, further comprising a damping apparatus configured to damp intentional movement of the body relative to the electrically insulating bracket.

21. The switching apparatus of claim 18, wherein the tank is grounded, and the mechanical interface is configured to attach to an electrically conductive support.

22. A switching apparatus comprising:
a body comprising:
a sidewall that extends from a first end to a second end, the sidewall defining an interior space;
a mounting interface; and
a plurality of electrically insulating sheds that extend radially outward from an exterior surface of the sidewall;
a circuit interrupter in the interior space of the body;
a first terminal electrically connected to the circuit interrupter;
a second terminal electrically connected to the circuit interrupter; and
a mounting system comprising:
a first mounting assembly attached to the first terminal; and
a second mounting assembly attached to the second terminal,
wherein the mounting interface is not attached to the first terminal or the second terminal, and is configured to mechanically connect to a first type of mounting structure;
the first mounting assembly and the second mounting assembly are configured to mechanically connect to a second type of mounting structure that is different from the first type of mounting structure such that the switching apparatus is configured to be mechanically connected to at least two different types of mounting structures;

the at least two different types of mounting structures comprise an electrically insulating bracket and a utility structure, the utility structure is the first type of mounting structure, and the electrically insulating bracket is the second type of mounting structure;

the first mounting assembly is configured to connect the first terminal to a lower portion of the electrically insulating bracket;

the second mounting assembly is configured to connect the second terminal to an upper portion of the electrically insulating bracket; and one or more of the first mounting assembly and the second mounting assembly are configured to allow the body to move relative to the electrically insulating bracket.

23. The switching apparatus of claim 22, further comprising a tank.

24. The switching apparatus of claim 23, wherein the tank is ungrounded, and the mounting interface is configured to attach to an insulated support.

25. The switching apparatus of claim 23, wherein the tank is grounded, and the mounting interface is configured to attach to an electrically conductive support.

26. The switching apparatus of claim 23, wherein the mounting interface is directly attached to the tank.

27. The switching apparatus of claim 22, wherein the second mounting assembly is configured to allow the body to rotate relative to the electrically insulating bracket while the second terminal remains connected to the upper portion of the electrically insulating bracket.

28. The switching apparatus of claim 22, further comprising a damping apparatus configured to damp intentional movement of the body relative to the electrically insulating bracket.

* * * * *